(12) United States Patent
Wang

(10) Patent No.: US 11,852,262 B2
(45) Date of Patent: Dec. 26, 2023

(54) HEAT TRACING SYSTEMS FOR FLUID VALVES AND RELATED METHODS

(71) Applicant: EMERSON PROCESS MANAGEMENT (TIANJIN) VALVE CO., LTD., Tianjin (CN)

(72) Inventor: Jing Wang, Tianjin (CN)

(73) Assignee: EMERSON PROCESS MANAGEMENT (TIANJIN) VALVE CO., LTD., Tianjin (CN)

(*) Notice: Subject to any disclaimer, the term of this patent is extended or adjusted under 35 U.S.C. 154(b) by 31 days.

(21) Appl. No.: 17/594,327

(22) PCT Filed: Oct. 20, 2020

(86) PCT No.: PCT/CN2020/122200
§ 371 (c)(1),
(2) Date: Oct. 11, 2021

(87) PCT Pub. No.: WO2022/082432
PCT Pub. Date: Apr. 28, 2022

(65) Prior Publication Data
US 2022/0341507 A1    Oct. 27, 2022

(51) Int. Cl.
*F16K 49/00* (2006.01)
*F16K 1/22* (2006.01)
(Continued)

(52) U.S. Cl.
CPC .............. *F16K 49/007* (2013.01); *F16K 1/22* (2013.01); *F16K 1/36* (2013.01); *F16K 27/02* (2013.01); *Y10T 137/6579* (2015.04)

(58) Field of Classification Search
CPC ......................... F16K 49/005; Y10T 137/6579
See application file for complete search history.

(56) References Cited

U.S. PATENT DOCUMENTS 3,430,689 A * 3/1969 Heinz-Dieter ........ F16K 49/007
                                                                137/340
3,770,005 A * 11/1973 Brandenburg ........ F16K 27/044
                                                                137/340
(Continued)

FOREIGN PATENT DOCUMENTS

CN           101126456           2/2008
CN           104089030          10/2014
(Continued)

OTHER PUBLICATIONS

International Searching Authority, "International Search Report," issued in connection with International Patent Application No. PCT/CN2020/122200, dated Jul. 30, 2021, 6 pages.
(Continued)

*Primary Examiner* — Kevin F Murphy
(74) *Attorney, Agent, or Firm* — Hanley, Flight & Zimmerman, LLC

(57) ABSTRACT

Heat tracing systems and related methods are disclosed. An example valve includes a valve body defining a fluid flow passageway between a primary inlet and a primary outlet. The body valve has a first face adjacent the main inlet, the first face including a first groove. A first cover is positioned over the first groove to define a first heat tracing path. A secondary inlet is formed in the valve body and fluidly coupled to the first heat tracing path. A secondary outlet formed in the valve body and fluidly coupled to the first heat tracing path.

24 Claims, 14 Drawing Sheets

(51) Int. Cl.
*F16K 1/36* (2006.01)
*F16K 27/02* (2006.01)

(56) References Cited

U.S. PATENT DOCUMENTS

| | | | | |
|---|---|---|---|---|
| 3,973,585 | A | * | 8/1976 | Henderson ............ F16L 53/32 |
| | | | | 137/340 |
| 4,292,992 | A | * | 10/1981 | Bhide' .................... F16K 25/02 |
| | | | | 137/340 |
| 4,296,776 | A | * | 10/1981 | Muller .................. F16K 49/005 |
| | | | | 137/340 |
| 4,559,967 | A | * | 12/1985 | Gardner ................ F16K 1/2263 |
| | | | | 137/340 |
| 6,296,007 | B1 | | 10/2001 | Cifune |
| 8,256,450 | B2 | * | 9/2012 | Hansen .................. F16K 1/228 |
| | | | | 251/173 |
| 9,133,961 | B2 | * | 9/2015 | Farinone ............... F16K 49/005 |
| 2008/0017816 | A1 | | 1/2008 | Willats et al. |
| 2018/0259270 | A1 | * | 9/2018 | Dixon .................... B33Y 80/00 |

FOREIGN PATENT DOCUMENTS

| | | |
|---|---|---|
| CN | 206754395 | 12/2017 |
| CN | 109268512 | 1/2019 |
| KR | 20170046885 | 5/2017 |

OTHER PUBLICATIONS

International Searching Authority, "Written Opinion," issued in connection with International Patent Application No. PCT/CN2020/122200, dated Jul. 30, 2021, 4 pages.
International Bureau, "International Preliminary Report on Patentability", issued in connection with International Patent Application No. PCT/CN2020/122200 dated Apr. 13, 2023, 6 pages.

* cited by examiner

HEAT TRACING SYSTEMS FOR FLUID VALVES AND RELATED METHODS

CROSS-REFERENCE TO RELATED APPLICATIONS

This patent is a national stage application, filed under 35 U.S.C. § 371, of international patent application PCT/CN2020/122200, filed on Oct. 20, 2020, which is incorporated herein by reference in its entirety.

FIELD OF THE DISCLOSURE

This disclosure relates generally to valves and, more particularly, to heat tracing systems for fluid valves and related methods.

BACKGROUND

Control valves (e.g., sliding stem valves, rotary valves, axial flow valves, globe valves, etc.) are commonly used in industrial processes, such as oil and gas pipeline distribution systems and chemical processing plants, to control the flow of process fluids. In some industrial processes, butterfly valves are used to control the flow of process fluids. Butterfly valves are favored in certain applications because they are usually inexpensive to manufacture, relatively lightweight and provide quick and tight shut off. Typically, industrial process conditions, such as pressure conditions, operation temperatures, and the type of process fluids dictate the type of valves, including the types of butterfly valves that may be used.

SUMMARY

An example valve includes a valve body defining a fluid flow passageway between a primary inlet and a primary outlet. The body valve has a first face adjacent the main inlet. The first face includes a first groove. A first cover is positioned over the first groove to define a first heat tracing path. A secondary inlet is formed in the valve body and fluidly coupled to the first heat tracing path. A secondary outlet formed in the valve body and fluidly coupled to the first heat tracing path.

Another example valve body includes a fluid flow passageway to receive a process fluid. A flow control member positioned in the fluid flow passageway and movable relative to a seat ring between an open position and a closed position to control the process fluid through the fluid flow passageway. A first annular flow path is formed on a first side of the valve body. A secondary inlet is formed in the valve body to allow a heating media to enter the first annular flow path. A secondary outlet is formed in the valve body to allow the heating media to exit the first annular flow path.

Another example valve includes means for defining a fluid flow passageway to receive a process fluid between a primary inlet and a primary outlet. The example valve includes means for defining a heating flow path through the means for defining the fluid flow passageway, where the heating flow path is fluidly isolated from the fluid flow passageway. The valve further includes means for covering the means for defining the heating flow path, the means for covering to fluidly isolate the heating flow path from the fluid flow passageway.

Figure 1A:
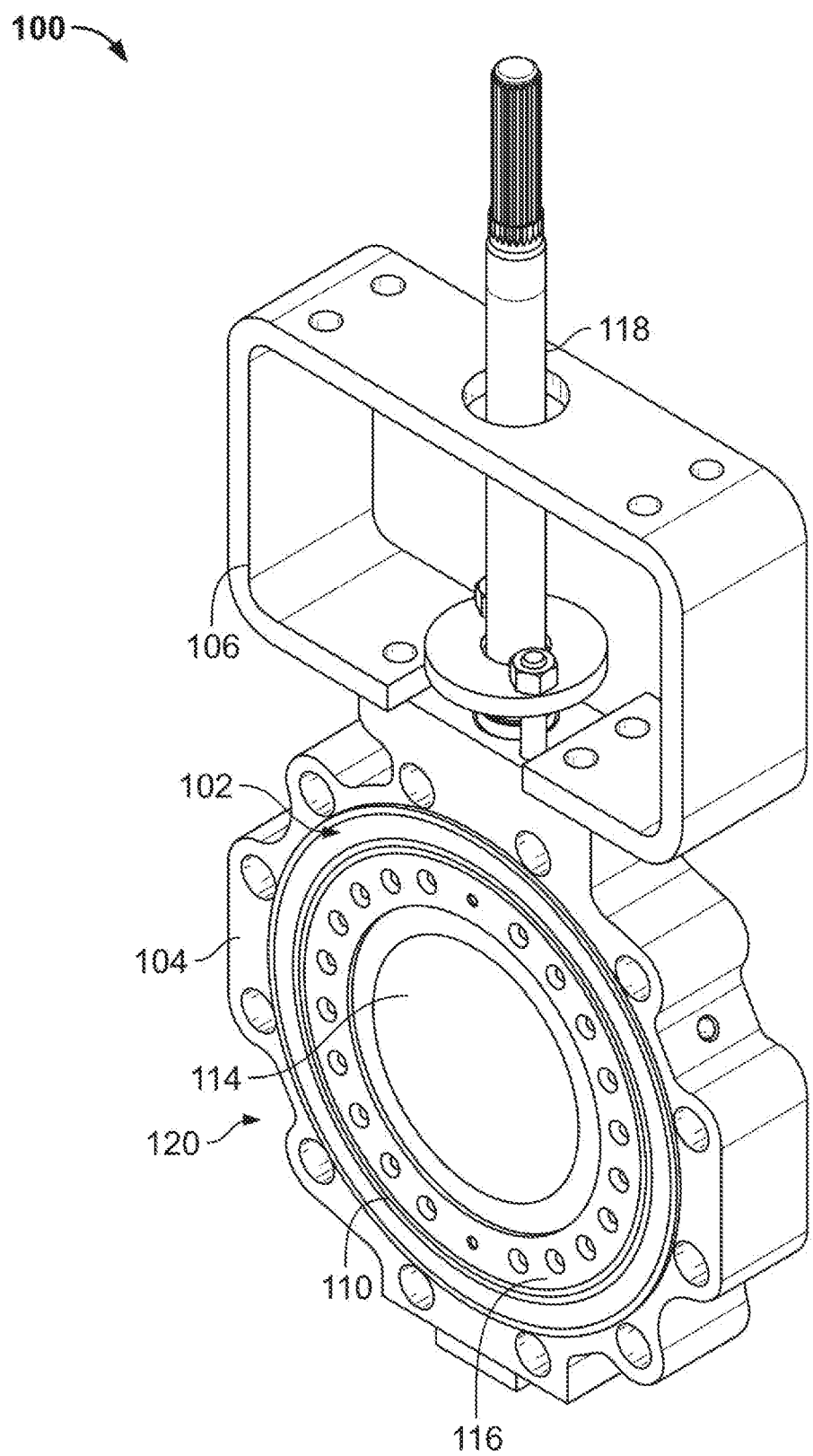
FIG. 1A is a perspective view of an example fluid valve constructed in accordance with the teachings disclosed herein.

Certain examples are shown above in the identified figures and described below in detail. In describing these examples, like or identical reference numbers are used to identify the same or similar elements. The figures are not necessarily to scale. Certain features and views of the figures may be exaggerated in scale or may be in schematic form for clarity or conciseness. Additionally, several examples have been described throughout this specification. Any features from any example may replace, be included with, or otherwise combine with other features from other examples.

DETAILED DESCRIPTION

The chemical industry produces industrial gases, large-volume commodity chemicals and polymers, chemical products for agricultural and medicinal uses, etc. In some types of chemical processing industries or other crystalline fluid environments, process fluids can be processed at relatively low-temperatures. For example, process fluids processed at relatively low temperatures can cause crystallization at a valve shaft and/or a seat ring of a fluid valve, which can restrict or prevent a flow control member of a fluid valve from moving to an open position. In some instances, crystallization can cause the valve stem to fracture and/or cause other damage to the fluid valve.

To prevent or reduce crystallization (e.g., to keep piping and/or valve interiors free of precipitating materials or crystallized hydrates), fluid valves and/or pipes often employ heat tracing systems (e.g., steam tracing). Heat tracing systems apply heat (e.g., via a heating media such as steam) to piping and/or fluid valves to protect fluid valves, instruments, and/or other components from low process fluid temperatures. For example, heat tracing systems can be used to prevent freezing, solidification, or separation, particularly in process control lines that cannot be flushed, blown down, or drained.

For large sized single-flange butterfly valves having a sufficient wall thickness, heat tracing systems can be provided by forming a pathway through the valve body that fluidly couples to a pathway formed in a valve trim (e.g., a valve shaft and/or a follower shaft). In such examples, a valve trim including a valve shaft is welded to a flow control member or disk to ensure alignment between the heat tracing paths of the respective valve body and the valve trim (e.g., the valve shaft, and the follower shaft, etc.). Additionally, the welded joints between the respective valve shaft and follower shaft and the disk must be sufficiently strong to enable the valve trim to be used as pressure devices for a pressurized heating media flowing through the heating tracing system.

However, the valve shaft and the follower shaft are welded to the disk after assembly of the of the valve shaft and the disk with the valve body. Additionally, a welding operation to weld the valve shaft and the disk is preformed adjacent a sealing surface of the disk. In some instances, the thermal stress imparted to the disk may not be (e.g., fully) released due to the space restrictions and can cause deformation of a sealing surface of the disk. In some instances, deformation of the sealing surface can affect (e.g., reduce) a sealing capability of the fluid valve and/or a leakage classification of the fluid valve. Additionally, a damaged or corroded weld joint between the disk and the respective valve shaft and the follower shaft can cause a heating media of the heating system to leak and/or contaminate a process fluid in a fluid flow passageway of the fluid valve. Furthermore, due to space constraints, fluid valves that employ a valve body having a smaller thickness or a single-flange may not be configured with heat tracing systems because a thickness of the valve body is not sufficient to support a flow path.

The example fluid valves disclosed herein employ heat tracing apparatus or systems that can be used with fluid valves of various types and/or sizes. For example, the heat tracing apparatus and methods disclosed herein can be formed with a single-flange rotary valve, a double-flange rotary valve, and/or any other types of fluid valves, piping, and/or other components. Additionally, example heat tracing apparatus and methods disclosed herein facilitate manufacturing and assembly of the fluid valves and significantly reduce manufacturing costs. For example, the heat tracing apparatus and methods disclosed herein do not require welding between the valve shaft and the flow disk to align and/or enforce a heat fluid flow path. Specifically, the heat path is not provided through the valve shaft. In contrast, the heat path is provided only through the valve body. For example, the heat path defines an inlet port formed along a first portion (e.g., a first angular position) of a valve body and an outlet port formed along a second portion (e.g., a second angular position) of a valve body different than the first portion. Thus, the heat tracing pathway is contained or formed (e.g., entirely) in the valve body.

Example heat tracing apparatus disclosed herein include a channel or fluid path formed in a valve body to receive heat media for heating the valve body. The example heat tracing apparatus can be integrally formed with the valve body as a unitary structure (e.g., a single piece) or may be formed by one or more components. An example heat tracing path disclosed herein includes a channel or recess formed in a face of a valve body and a cover positioned over the channel to define the heat tracing fluid path. The cover can be coupled or attached to the valve body via a fastener such as, for example, a weld, a screw, a rivet, and/or any other suitable fastener(s). In some examples, the heat tracing path is formed with the valve body via additive manufacturing processes or techniques (e.g., 3-D printing). The heat tracing path disclosed herein can be an annular flow path formed on the face of the valve body and/or may be a partially annular flow path (e.g., a segment) formed on the face of the valve body. In some examples, a heat tracing path can be formed on a first face defining an inlet side of a valve body and/or on a second face defining an outlet side of the valve body opposite the first face. The example heat tracing path disclosed herein is fluidly isolated from a fluid flow passageway of a valve body. Additionally, because the heat tracing path is integrally formed with the valve body, example heat tracing apparatus and methods disclosed herein eliminate or significantly reduce cross-contamination between a process fluid and a heating media.

Figure 1B:
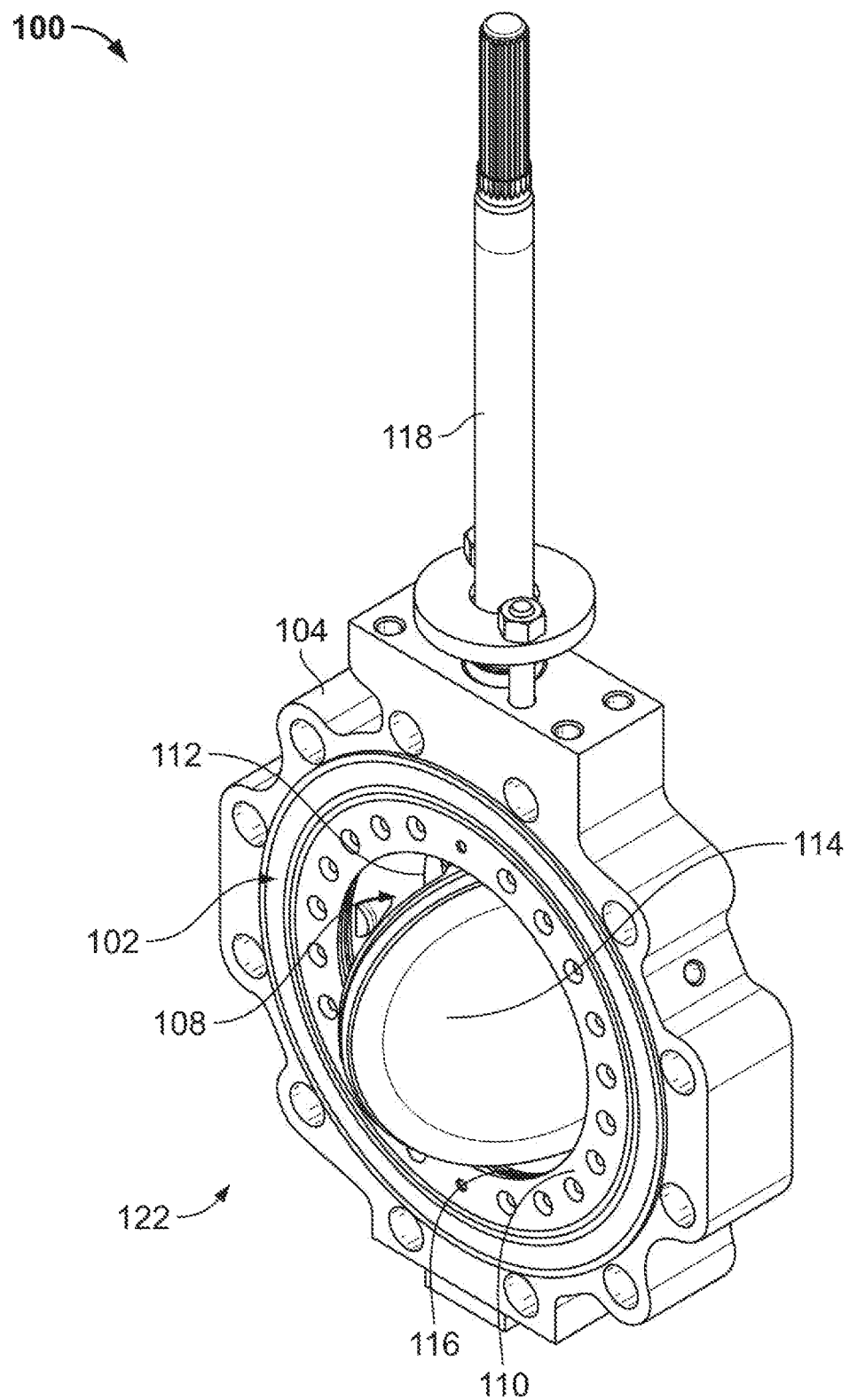
FIG. 1B is another perspective view of the example fluid valve of FIG. 1A.

FIGS. 1A and 1B depict a fluid or rotary valve 100 having an example heat tracing apparatus 102 constructed in accordance with the teachings disclosed herein. The rotary valve 100 shown in FIGS. 1A and 1B can, for example, be used to control process fluids, such as natural gas, oil, water, polymers, chemicals, etc. over a wide range of temperatures and/or fluid pressures. The rotary valve 100 has a valve body 104 and a bonnet 106 (e.g., an extension bracket shown in FIG. 1A) to couple the valve body 104 to an actuator (not shown) (e.g., a manual actuator, a pneumatic actuator, etc.). The valve body 104 defines a fluid flow passageway 108 (FIG. 1B) to receive a process fluid between a primary inlet 110 (e.g., a first inlet) and a primary outlet 112 (e.g., a first outlet). A flow control member 114 (e.g., a butterfly valve disk) is interposed in the fluid flow passageway 108 and movable relative to a seating surface 116 (e.g., a seat ring) of the valve body 104 to control fluid flow through the fluid flow passageway 108. More specifically, the flow control member 114 is operatively coupled to the actuator via a valve shaft 118 that causes the flow control member 114 to move (e.g., rotate, turn, etc.) relative to the seating surface 116 (e.g., a seat ring) of the fluid flow passageway 108 between a closed position 120 of FIG. 1A and an open position 122 of FIG. 1B. In some examples, the valve body 104 provides means for defining the fluid flow passageway 108 to receive a process fluid between the primary inlet 110 and the primary outlet 112.

Figure 2A:
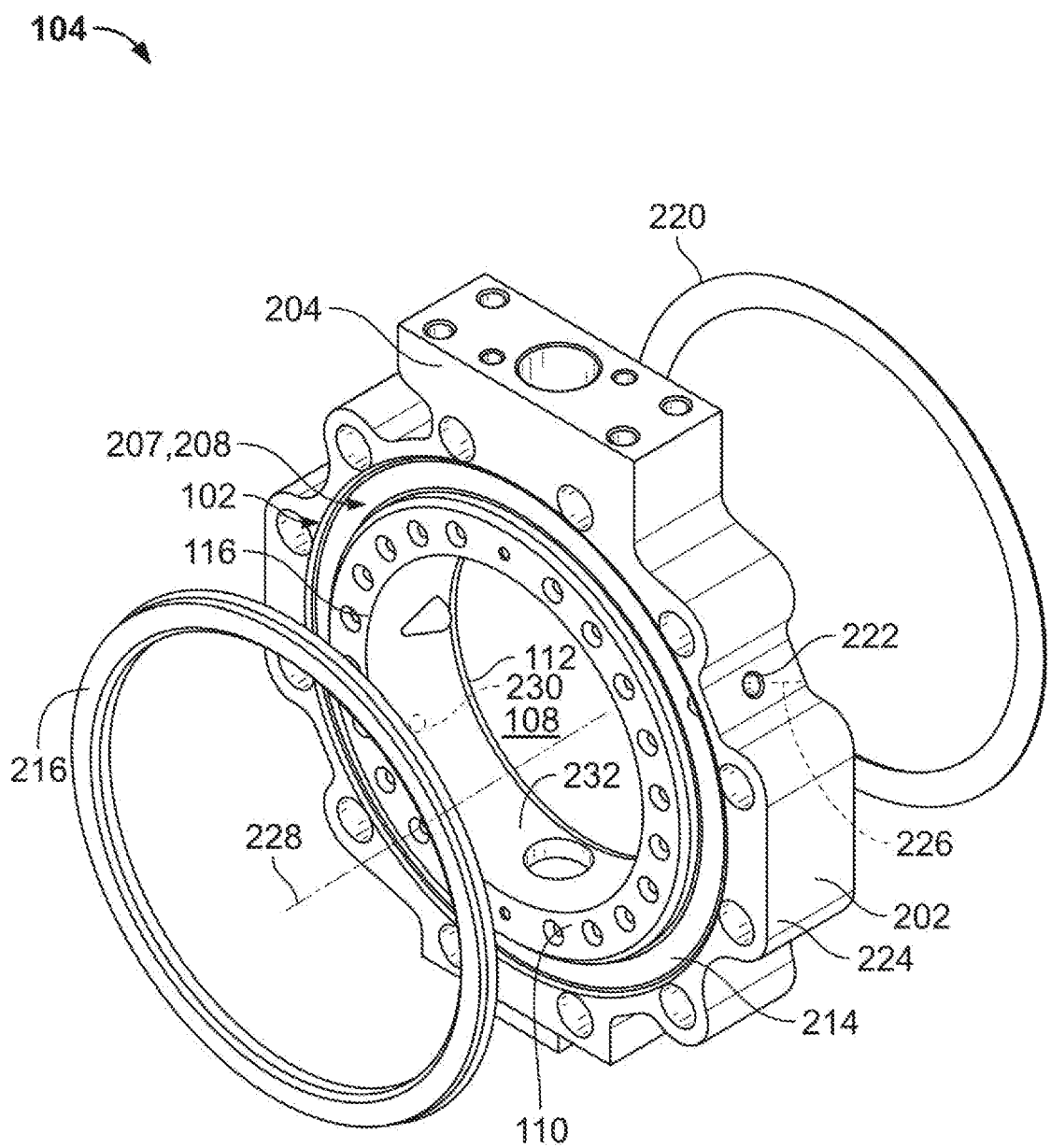
FIG. 2A is a perspective, partially exploded view of an example valve body of the example fluid valve of FIGS. 1A and 1B.
Figure 2B:
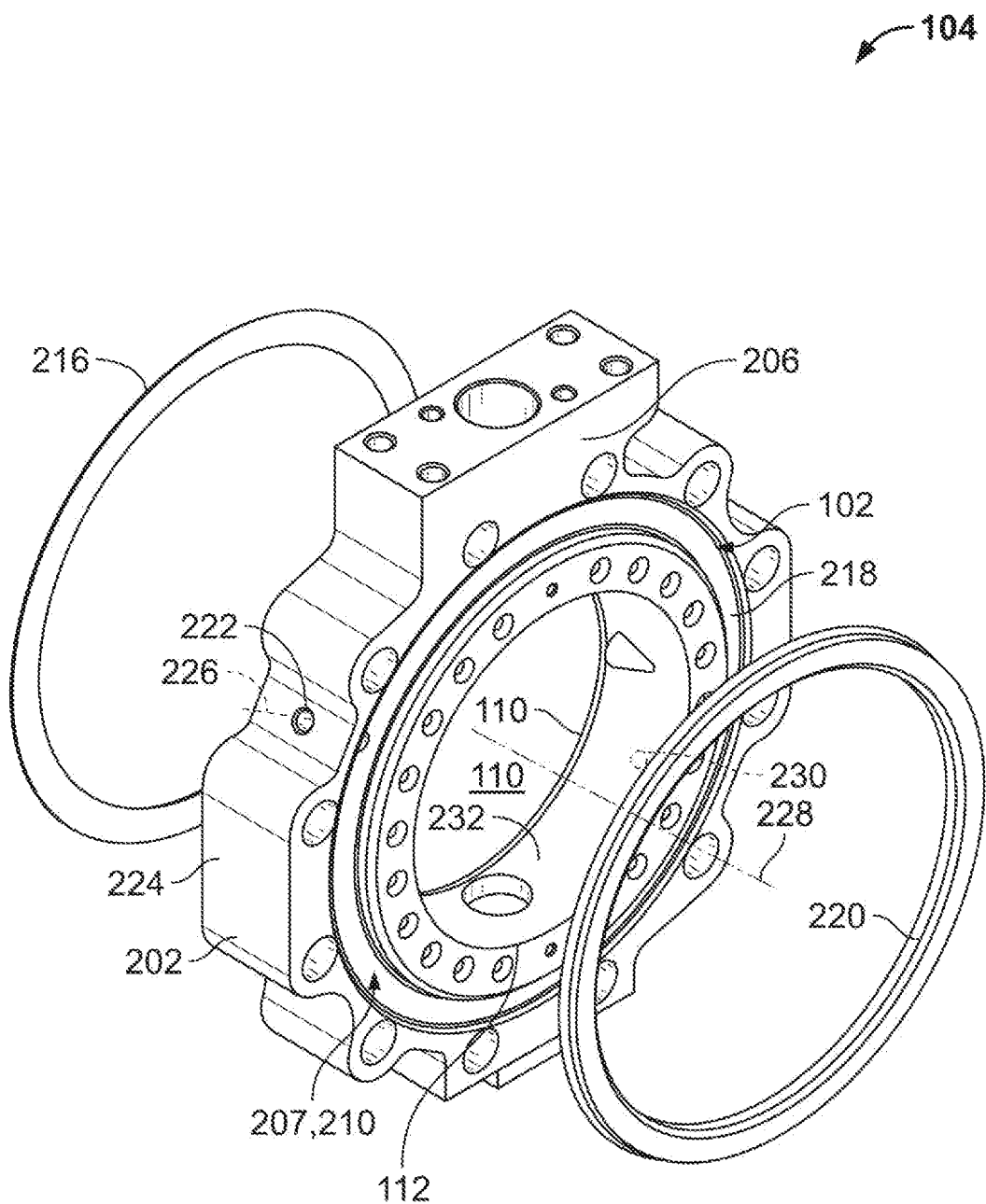
FIG. 2B is another perspective, partially exploded view of the example valve body of FIG. 2B.

FIGS. 2A and 2B are partially exploded views of the valve body 104 of FIGS. 1A and 1B. FIG. 2A is a perspective view of the valve body 104 shown from the primary inlet 110 and FIG. 2B is a perspective view of the valve body 104 shown from the primary outlet 112.

The valve body 104 of the illustrated example includes a flange 202 to receive an upstream pipe at the primary inlet 110 and a downstream pipe at the primary outlet 112. For example, the valve body 104 (e.g., the flange) has an inlet or first face 204 (FIG. 2A) adjacent the primary inlet 110 to receive the upstream pipe and an outlet or second face 206 (FIG. 2B) adjacent the primary outlet 112 (e.g., and opposite the first face 204) to receive the downstream pipe. The valve body 104 of the illustrated example is a single-flange, valve body.

To provide heat to one or more of the valve body 104, the flow control member 114 (FIGS. 1A and 1B), the seating surface 116, a process fluid flowing through the fluid flow passageway 108 and/or other components of the rotary valve 100, the rotary valve 100 of the illustrated example includes the heat tracing apparatus 102 disclosed herein. Specifically, unlike some known heat tracing apparatus that have flow paths in a valve shaft and a follower shaft, the heat tracing apparatus 102 of the illustrated example is formed (e.g., entirely) with the valve body 104. To this end, the heat tracing apparatus 102 is (e.g., entirely) defined by or formed with the valve body 104. Thus, the heat tracing apparatus 102 of the illustrated example does not have a flow path in the valve shaft 118, which significantly reduces manufacturing costs and complexity.

The heat tracing apparatus 102 of the illustrated example includes a heat tracing path 207. The heat tracing path 207 of the illustrated example includes a first heat tracing path 208 and a second heat tracing path 210. The first heat tracing path 208 is provided adjacent the first face 204 of the valve body 104 and the second heat tracing path 210 is provided adjacent the second face 206 of the valve body 104. In other words, the first heat tracing path 208 is formed adjacent the primary inlet 110 and the second heat tracing path 210 is formed adjacent the primary outlet 112. Thus, the fluid flow passageway 108 is formed between the first face 204 and the second face 206 and defines a first flow path for a process fluid between the primary inlet 110 and the primary outlet 112. The heat tracing path 207 (e.g., the first heat tracing path 208) provides a second flow path for a heating fluid. In this example, the heat tracing path 207 (e.g., the second heat tracing path 210) provides a third flow path for the heating fluid. In the illustrated example, the heat tracing path 207 (e.g., first heat tracing path 208 and the second heat tracing path 210) is fluidly isolated from the fluid flow passageway 108. In other words, heating media (e.g., steam) flowing through the first heat tracing path 208 and the second heat tracing path 210 cannot contaminate a process fluid flowing through the fluid flow passageway 108. Also, the first heat tracing path 208 of the illustrated example is fluidly coupled to the second heat tracing path 210. However, in some examples, the first heat tracing path 208 can be fluidly isolated from the second heat tracing path 210. In some examples, the valve body 104 can include only the first heat tracing path 208 or the second heat tracing path 210.

Referring to FIG. 2A, the first heat tracing path 208 includes a first channel 214 and a first cover 216. The first channel 214 is formed in the first face 204 of the valve body 104. The first cover 216 couples to the valve body 104 to cover the first channel 214. When the first cover 216 is coupled to the valve body 104, the first cover 216 and the first channel 214 from the first heat tracing path 208. Similarly, referring to FIG. 2B, the second heat tracing path 210 includes a second channel 218 and a second cover 220. The second channel 218 is formed in the second face 206 of the valve body 104. The second cover 220 couples to the valve body 104 to cover the second channel 218. When the second cover 220 is coupled to the valve body 104, the second cover 220 and the second channel 218 form the second heat tracing path 210. To enable heating media to enter the heat tracing path 207, the valve body 104 defines a secondary inlet 222 (e.g., an inlet port) of the heat tracing apparatus 102. Specifically, the secondary inlet 222 is formed on a side wall 224 (e.g., a peripheral wall, an outer side wall or surface) of the valve body 104 between the first face 204 and the second face 206. The secondary inlet 222 has a longitudinal axis 226 that is non-parallel (e.g., perpendicular) relative to a longitudinal axis 228 of the fluid flow passageway 108. To allow the heating media to exit the heat tracing path 207, the valve body 104 of the illustrated example includes a secondary outlet 230 (e.g., an outlet port) shown in hidden lines in FIG. 2B that is formed on the side wall 224 of the valve body 104 opposite the secondary inlet 222. The secondary outlet 230 is shown in hidden lines because it is not visible or accessible from an inner surface 232 (e.g., an inner wall) of the fluid flow passageway 108. Although the heat tracing path 207 is formed with the valve body 104, the fluid flow passageway 108 defined by the inner surface 232 of the valve body 104 is fluidly isolated from the secondary inlet 222, the secondary outlet 230 and the heat tracing path 207.

The heat tracing apparatus 102 disclosed herein are not limited to single-flange, rotary valves. In some examples, the heat tracing apparatus 102 disclosed herein can be employed with double-flange, rotary valves, and/or any other type of fluid valves (e.g., rotary valves, linear valves, sliding stem valves, etc.), piping, and/or any other fluid distribution component(s) or structure(s).

Figure 3A:
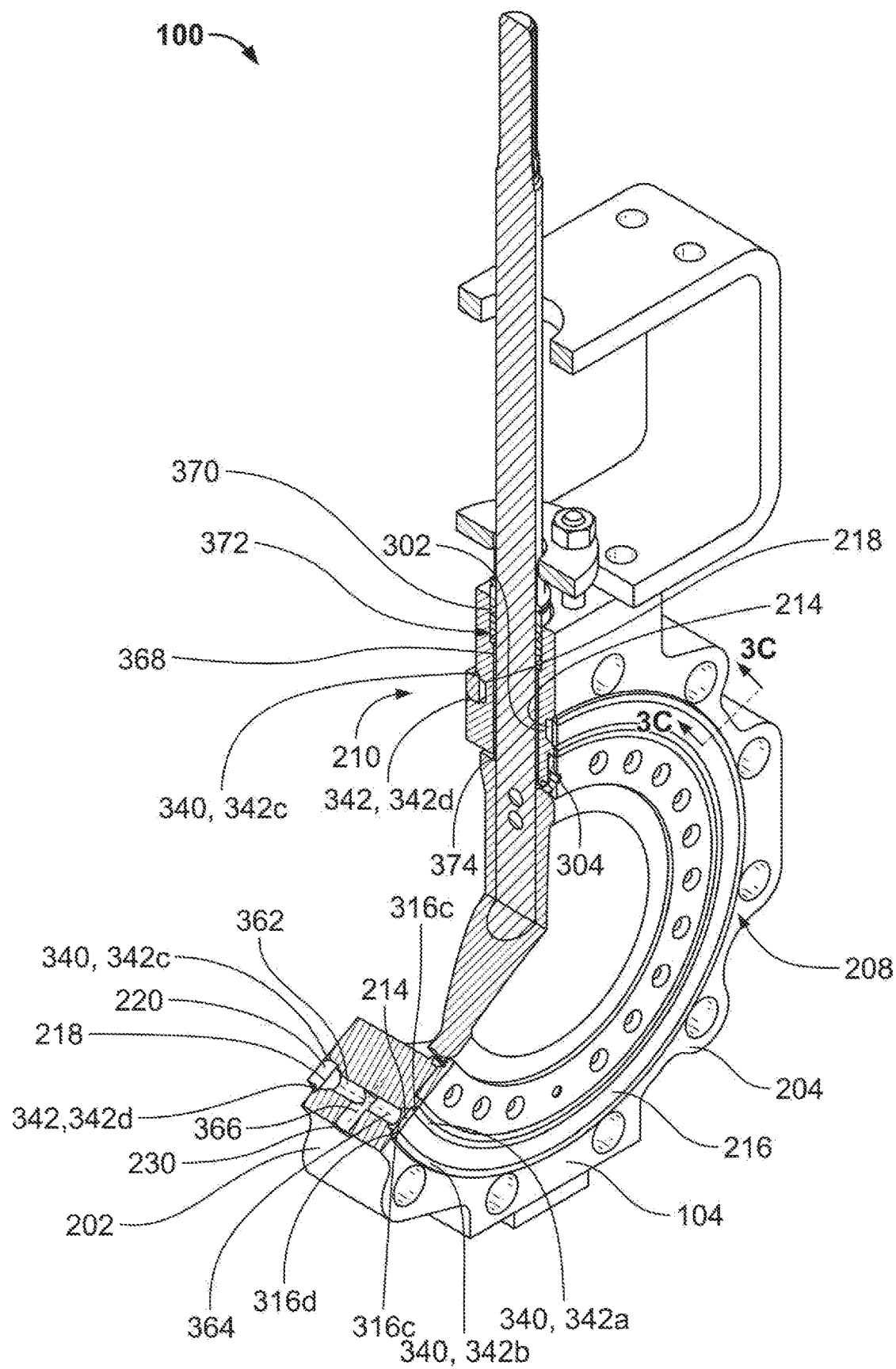
FIG. 3A is a partial, cut-away view of the example fluid valve of FIGS. 1A and 1B.
Figure 3B:
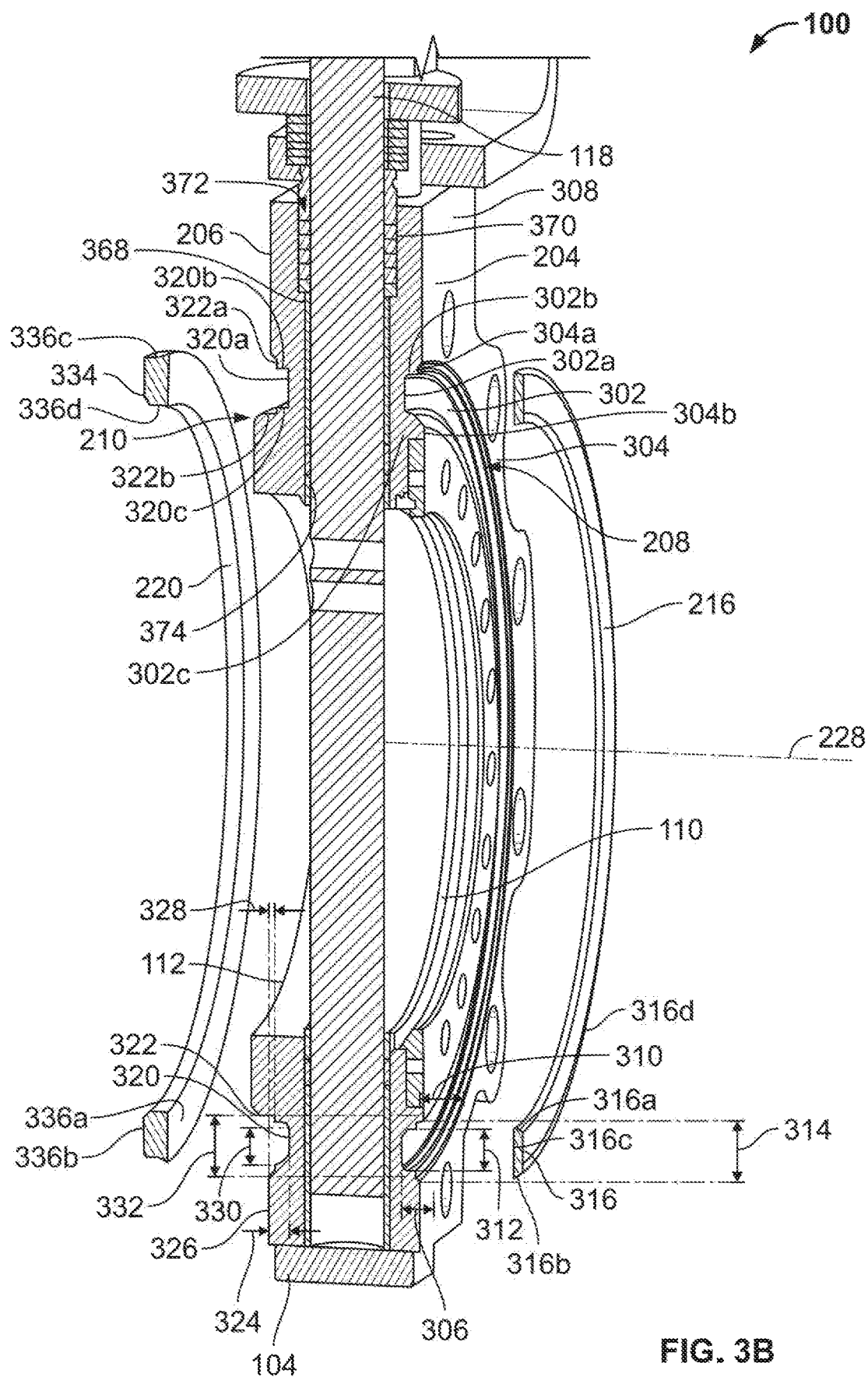
FIG. 3B is a partially exploded, cross-sectional view of the example fluid valve of FIGS. 1A and 1B.
Figure 3C:
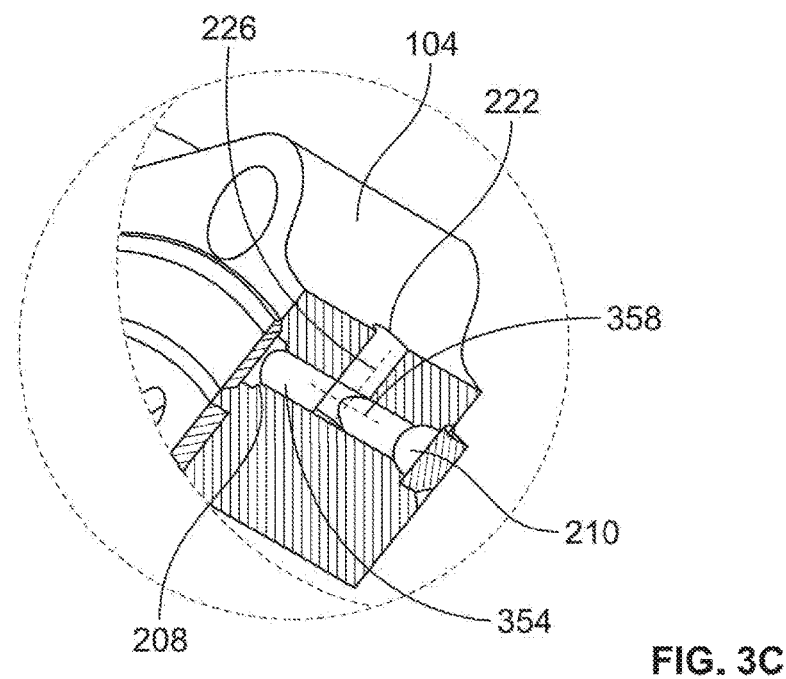
FIG. 3C is a partial, perspective side view of the example valve body of the fluid valve of FIGS. 1A and 1B.

FIG. 3A is a partial, cutaway perspective view of the rotary valve 100 of FIGS. 1A and 1B. FIG. 3B is a partially exploded, cross-sectional perspective view of the rotary valve 100 of FIGS. 1A and 1B. FIG. 3C is an enlarged, partial cross-sectional view of the secondary inlet 222 of FIGS. 2A and 2B.

Referring to FIGS. 3A and 3B, the first channel 214 of the illustrated example is formed by a first groove 302 (e.g., a first recess) and a second groove 304 (e.g., a second recess) formed on the first face 204 of the valve body 104. The first groove 302 includes a first wall 302a, a second wall 302b and a third wall 302c. The second wall 302b and the third wall 302c (e.g., are perpendicular or non-parallel to and) extend away from the first wall 302a to define the first channel 214. The second groove 304 is formed adjacent the first groove 302 to receive the first cover 216. For example, the first recess 302 has a first depth 306 relative to an outer surface 308 (e.g., an outermost surface) of the first face 204 that is greater than a second depth 310 of the second groove 304 relative to the outer surface 308 of the first face 204. The first groove 302 of the illustrated example has a first width 312 that is less than a second width 314 of the second groove 304. As a result, the first groove 302 and the second groove 304 form a first shoulder 304a and a second shoulder 304b to receive the first cover 216. For example, the first shoulder 304a and the second shoulder 304b from a seating surface to receive the first cover 216. At least a portion of a cross-sectional profile 316 of the first cover 216 of the illustrated example that is to engage the first shoulder 304a and the second shoulder 304b is complementary to a profile or shape of the first shoulder 304a and the second shoulder 304b to enable the first cover 216 to matably engage (e.g. lay flush) with the second groove 304. The cross-sectional profile 316 of the first cover 216 has a trapezoidal shape. The first cover 216 has side walls 316a, 316b positioned between an inner surface 316c and an outer surface 316d and that taper inwardly toward the outer surface 316d from the inner surface 316c. The side walls 316a, 316b facilitate fastening of the first cover 216 to the first face 204. When the first cover 216 is coupled to the first face 204, the first groove 302 (e.g., the first wall 302a, the second wall 302b and the third wall 302c) and the inner surface 316c of the first cover 216 define the first heat tracing path 208. The outer surface 316d of the first cover 216 (e.g., opposite the inner surface 316c) protrudes from the first face 204 when the first cover 216 is coupled to the valve body 104 (e.g., FIG. 3A). However, in some examples, the outer surface 316d of the first cover 216 can be flush mounted with the first face 204 of the valve body 104.

The first heat tracing path 208 of the illustrated example is an annular flow path. For example, the first channel 214 of the illustrated example is a continuous, annular channel and the first cover 216 of the illustrated example is a ring. However, in some examples, the first channel 214 can be formed along only a portion (e.g., a segment) of a circumference of the first face 204 of the valve body 104. For example, the first channel 214 can be formed on a portion of the first face 204 of the valve body 104. In other words, the first channel 214 can be formed as an arcuate length (e.g., a minor arc of a circle) relative to the longitudinal axis 228 (e.g., of approximately between 90 degrees and 180 degrees). In some examples, the first cover 216 is formed as an arc having a length substantially equal to a length of the first channel 214. In some examples, the heat tracing apparatus 102 can employ stops or plugs that couple to respective ends of the first channel 214 to prevent heating media from escaping the first channel 214 when the first channel 214 is a partial channel (e.g., (e.g., a segment) formed on the first face 204.

The second heat tracing path 210 of the illustrated example is similar (e.g., substantially identical) to the first heat tracing path 208. The second channel 218 of the illustrated example is formed by a third groove 320 (e.g., a third recess) and a fourth groove 322 (e.g., a fourth recess) formed on the second face 206. The third groove 320 includes a first wall 320a, a second wall 320b and a third wall 320c. The second wall 320b and the third wall 320c (e.g., are perpendicular or non-parallel to and) extend away from the first wall 320a to define the second channel 218. The fourth groove 322 is formed adjacent the third groove 320 to receive the second cover 220. For example, the third groove 320 has a first depth 324 relative to an outer surface 326 (e.g., an outermost surface) of the second face 206 that is greater than a second depth 328 of the fourth groove 322 relative to the outer surface 326 of the second face 206. The fourth groove 322 of the illustrated example has a first width 330 that is less than a second width 332 of the third groove 320. As a result, the third groove 320 and the fourth groove 322 form a first shoulder 322a and a second shoulder 322b to receive the second cover 220. The first shoulder 322a and the second shoulder 322b define a seating surface to receive the second cover 220. At least a portion of a cross-sectional profile 334 of the second cover 220 of the illustrated example that is to engage the first shoulder 322a and the second shoulder 322b is complementary to a profile or shape of the first shoulder 322a and the second shoulder 322b to enable the second cover 220 to matably engage (e.g. lay flush) with the fourth groove 322. For example, an inner surface 336a of the second cover 220 engages the first shoulder 322a and the second shoulder 322b when the second cover 220 is coupled to the second face 206. When the second cover 220 is coupled to the second face 206, the third groove 320 (e.g., the first wall 320a, the second wall 320b and the third wall 320c) and the inner surface 336a of the second cover 220 define the second heat tracing path 210. An outer surface 336b of the second cover 220 (e.g., opposite the inner surface 336a) protrudes from the second face 206 when the second cover 220 is coupled to the valve body 104 (e.g., FIG. 3A). However, in some examples, the outer surface 336b of the second cover 220 can be flush mounted relative to the second face 206 of the valve body 104.

The second heat tracing path 210 of the illustrated example is an annular flow path. For example, the second channel 218 of the illustrated example is a continuous, annular channel and the second cover 220 of the illustrated example is a ring. However, in some examples, the second channel 218 can be formed along only a portion (e.g., a segment) of a circumference of the second face 206 of the valve body 104. For example, the second channel 218 can be formed on a portion of the second face 206 of the valve body 104. In other words, the second channel 218 can be formed as an arcuate length (e.g., a minor arc of a circle) relative to the longitudinal axis 228 (e.g., of approximately between 90 degrees and 180 degrees). In some examples, the second cover 220 is formed as an arc having a length substantially equal to a length of the second channel 218. In some examples, the heat tracing apparatus 102 can employ stops or plugs that couple to respective ends of the second channel 218 to prevent heating media from escaping the second channel 218 when the second channel 218 is a partial channel (e.g., (e.g., a segment) formed on the second face 206.

To couple the first cover 216 to the first face 204 (e.g., the second groove 304 formed on the first face 204) and the second cover 220 to the second face 206 (e.g., the fourth groove 322 formed on the second face 206), the heat tracing apparatus 102 employs a fastener 340. The fastener 340 of the illustrated example is a plurality of welds 342a-d. For example, a first weld 342a is provided between the first side wall 316a of the first cover 216 and the first face 204 and a second weld 342b is provided between the second side wall 316b of the first cover 216 and the first face 204. Likewise, a third weld 342c is provided between a first side wall 336c of the second cover 220 and the second face 206 and the second side wall 336d of the second cover 220 and the second face 206. However, in other examples, the first cover 216 can be coupled to the first face 204 and/or the second cover 220 can be coupled to the second face 206 via screws, rivets, and/or any other fastener(s).

The heat tracing apparatus 102 of the illustrated example includes the secondary inlet 222 and the secondary outlet 230 (FIG. 3A). The secondary inlet 222 and the secondary outlet 230 are fluidly coupled the first heat tracing path 208 and the second heat tracing path 210. To fluidly couple the secondary inlet 222 to the first heat tracing path 208 and the second heat tracing path 210, the heat tracing apparatus 102 of the illustrated example includes an inlet channel 354. The inlet channel 354 extends through the valve body 104 between the first wall 302a of the first groove 302 and the first wall 320a of the third groove 320, thereby fluidly coupling the first heat tracing path 208 and the second heat tracing path 210. The inlet channel 354 is in fluid communication with (e.g., receives fluid from) the secondary inlet 222. The inlet channel 354 of the illustrated example has a longitudinal axis 358 that is substantially non-perpendicular (e.g., parallel) relative to the longitudinal axis 228 of the fluid flow passageway 108. The longitudinal axis 358 of the inlet channel 354 is non-parallel (e.g., perpendicular) relative to the longitudinal axis 226 of the secondary inlet 222. Likewise, to fluidly couple the secondary outlet 230 to the first heat tracing path 208 and the second heat tracing path 210, the heat tracing apparatus 102 of the illustrated example includes an outlet channel 362. The outlet channel 362 extends through the valve body 104 between the first wall 302a of the first groove 302 and the first wall 320a of the third groove 320, thereby fluidly coupling the first heat tracing path 208 and the second heat tracing path 210. The outlet channel 362 is in fluid communication with (e.g., expels fluid from) the secondary outlet 230. The outlet channel 362 has a longitudinal axis 364 that is substantially non-perpendicular (e.g., parallel) relative to the longitudinal axis 228 of the fluid flow passageway 108. The longitudinal axis 364 of the outlet channel 362 is non-parallel (e.g., perpendicular) relative to a longitudinal axis 366 of the secondary outlet 230.

In the illustrated example, the inlet channel 354 fluidly couples the secondary inlet 222 to the first heat tracing path 208 and the second heat tracing path 210 and the outlet channel 362 fluidly couples the secondary outlet 230 to the first heat tracing path 208 and the second heat tracing path 210. In some examples, the valve body 104 can be configured such that the first heat tracing path 208 is fluidly isolated or independent from the second heat tracing path 210. In some examples, each of the first heat tracing path 208 and the second heat tracing path 210 have dedicated secondary inlets and secondary outlets. As a result, the first heat tracing path 208 can receive a first heating fluid having a first temperature and the second heat tracing path 210 can receive a heating fluid having a second temperature different than the first temperature. In some examples, each of the first heat tracing path 208 and the second heat tracing path 210 can receive different types of heating fluids.

Additionally, the valve body 104 of the illustrated example includes a shaft bore 368 to receive the valve shaft 118 and a packing bore 370 (e.g., coaxially aligned with the shaft bore 368) to receive a packing assembly 372. The packing assembly 372 prevents process fluid from leaking past the valve shaft 118 via the shaft bore 368 and to the environment. Additionally, the valve body 104 of the illustrated example includes a blocking ring 374.

Figure 4:
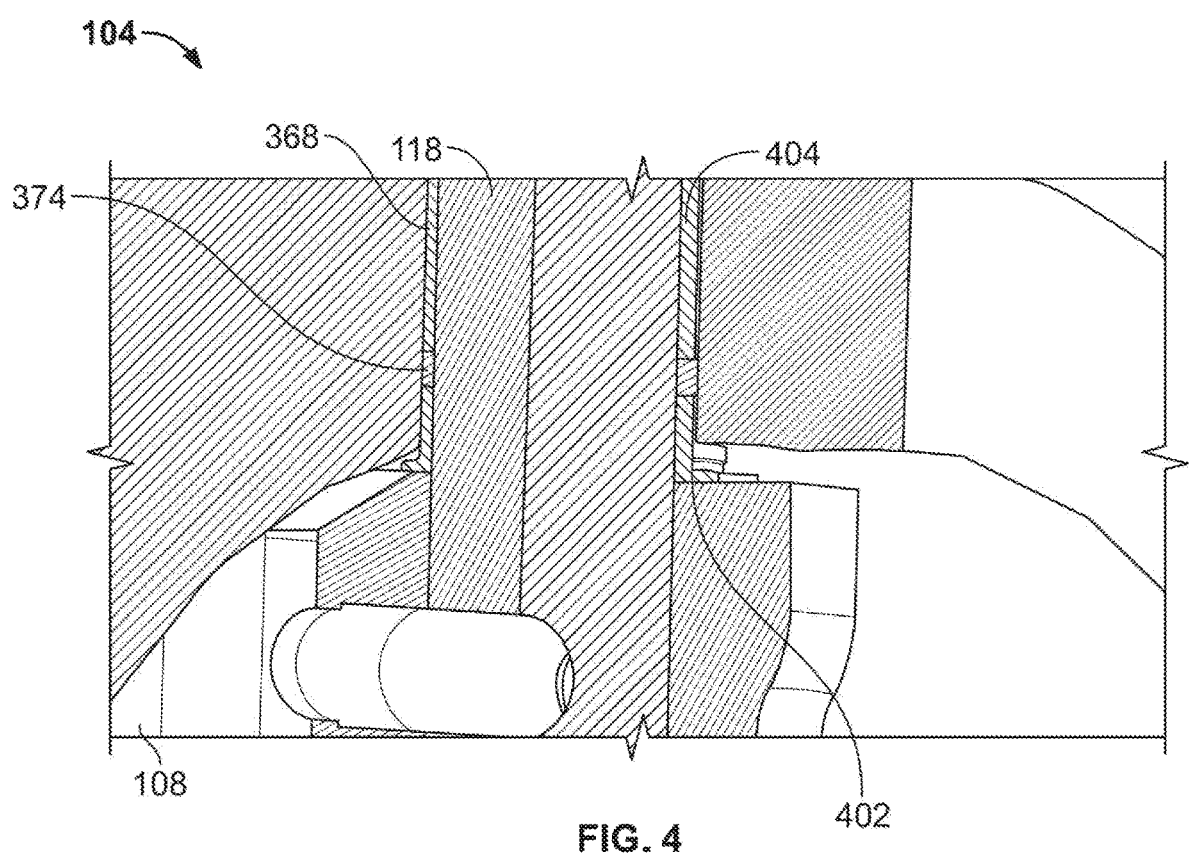
FIG. 4 is an enlarged, partial cutaway view of the example fluid valve of FIGS. 1A and 1B.

FIG. 4 is an enlarged, partial cutaway view of the shaft bore 368 of the rotary valve 100 of FIG. 3B. Referring to FIG. 4, the blocking ring 374 is positioned between a first bearing 402 and a second bearing 404. The first bearing 402 and the second bearing 404 facilitate (e.g., enable) rotation of the valve shaft 118 relative to the valve body 104. The blocking ring 374 of the illustrated example is made of a nonmetal like material such as, for example, graphite. However, in other examples, the blocking ring 374 can be made of any suitable material(s) such as alloys, metals, etc. The blocking ring 374 of the illustrated example restricts or prevents (e.g. blocks) process fluid in the fluid flow passageway 108 from entering between the valve shaft 118 and the second bearing 404 to further reduce risk of crystallization.

Figure 5A:
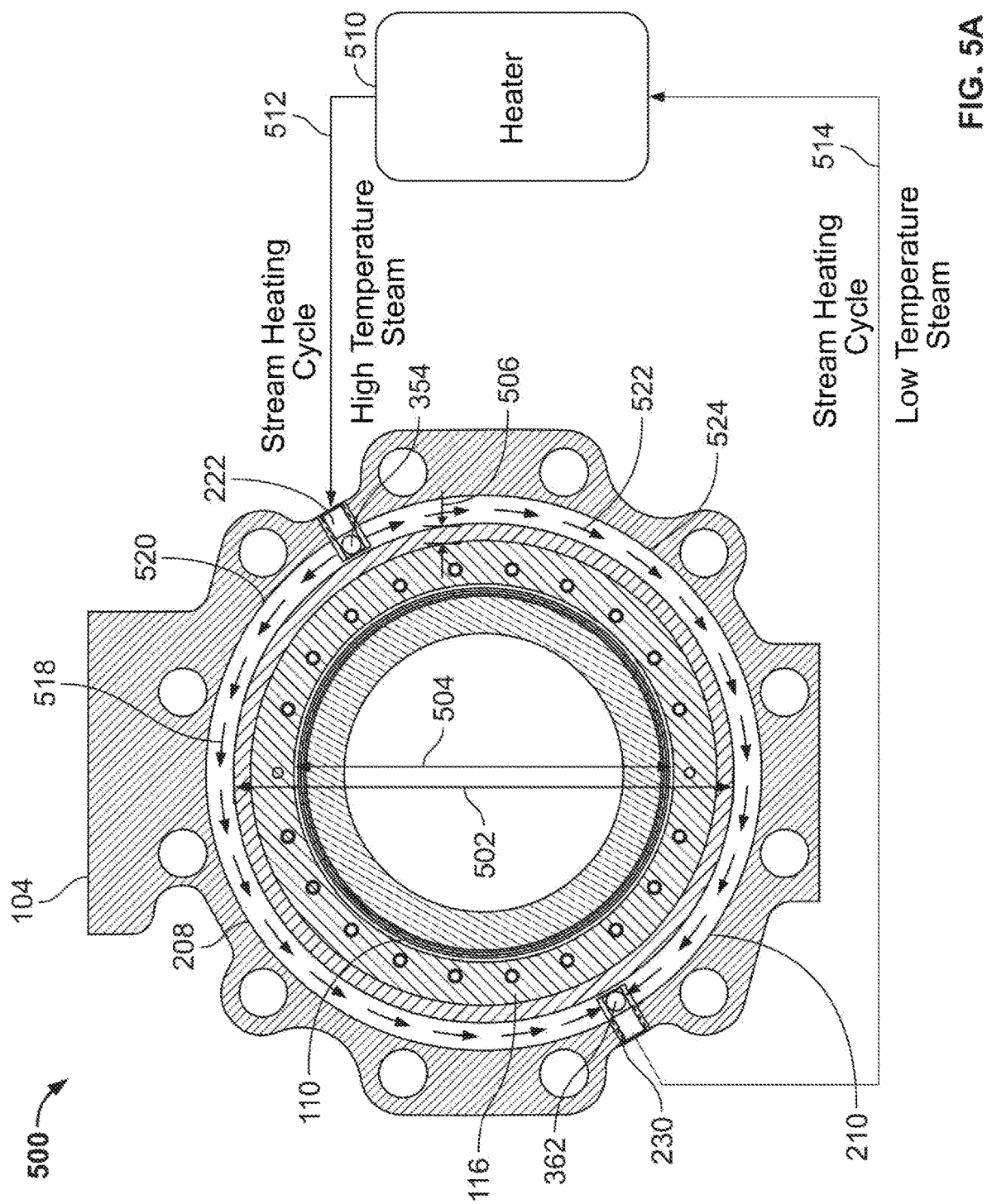
FIG. 5A is a schematic illustration of an inlet side of the example valve body of the example fluid valve of FIGS. 1A and 1B implemented with an example heating system.
Figure 5B:
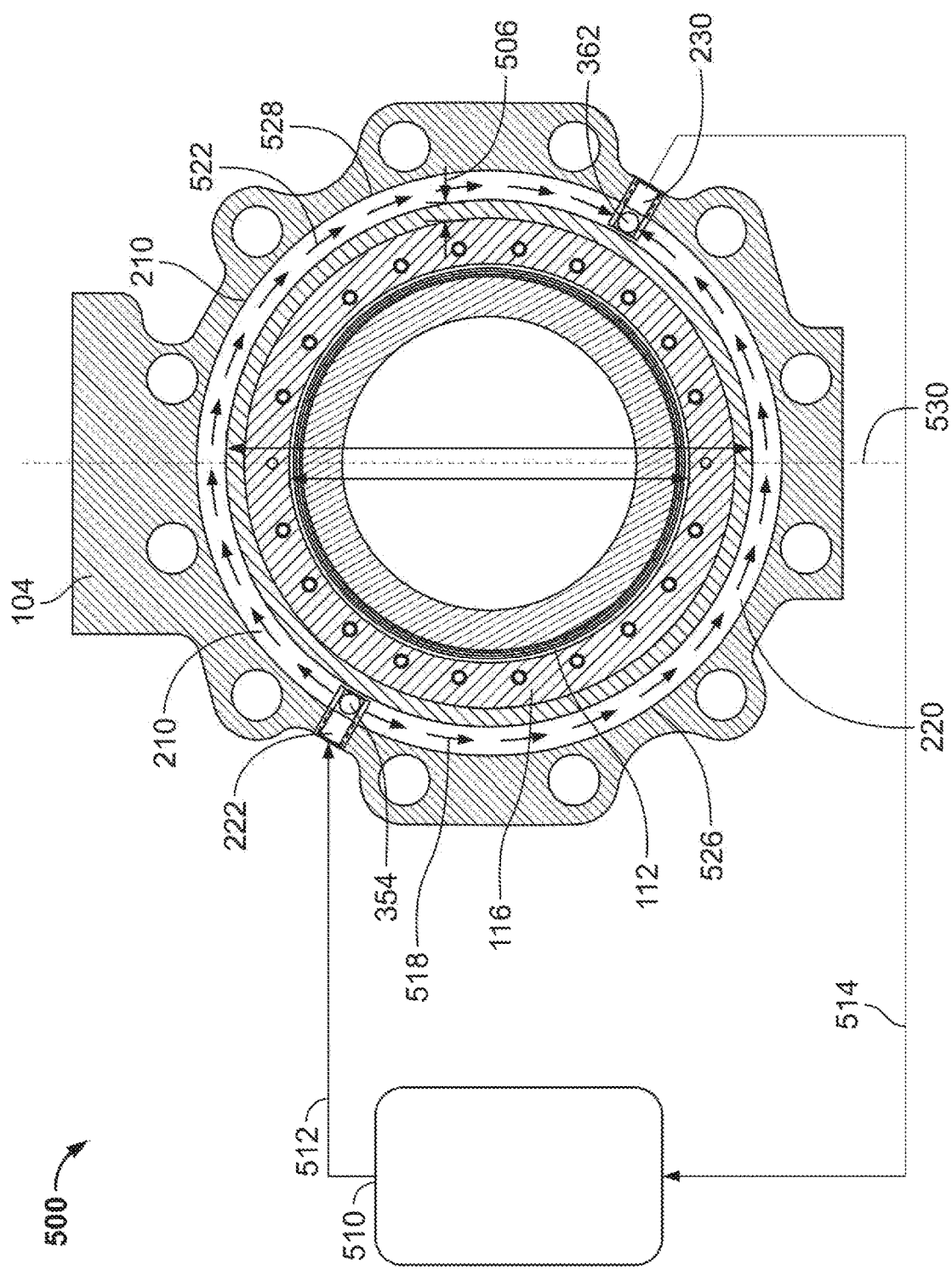
FIG. 5B is a schematic illustration of an outlet side of the example valve body of the example fluid valve of FIGS. 1A and 1B implemented with the example heating system.

FIGS. 5A and 5B are schematic illustrations of the valve body 104 operatively coupled to a heating system 500 (e.g., a steam heating system). FIG. 5A is a cross-sectional view of the valve body 104 showing the primary inlet 110 and FIG. 5B is a cross-sectional view of the valve body 104 showing the primary outlet 112.

The first cover 216 and the second cover 220 of the illustrated example are annular covers or rings. The first cover 216 and the second cover 220 each have an inner diameter 502 that is greater than an outer diameter 504 of the seating surface 116 of the valve body 104. For example, the first cover 216 and the second cover 220 are spaced from the seating surface 116 by a gap 506. In this manner, the first cover 216 and the second cover 220 do not interfere with the seating surface 116 of the valve body 104. In some examples, the seating surface 116 (e.g., the seat ring) of the valve body 104 can be removed from the valve body 104 without requiring removal of the first cover 216 and/or the second cover 220. Thus, the heat tracing path 207 (e.g., each of the first heat tracing path 208 and the second heat tracing path 210) has a diameter that is greater than a diameter of the fluid flow passageway 108.

The heating system 500 provides heating media (e.g., a heating fluid, steam, etc.) to the heat tracing apparatus 102. The heating system 500 includes a heater 510, a first fluid line 512 (e.g., a first pipe) that is fluidly coupled to the secondary inlet 222 of the valve body 104 (e.g., via a fitting or coupler) and a second fluid line 514 (e.g., a second pipe or return line) that that is fluidly coupled to the secondary outlet 230 of the valve body 104 (e.g., via a fitting or coupler).

In operation, for example, the heater 510 heats the heating media to a predetermined temperature (e.g., a high temperature steam). For example, the heater 510 includes a predetermined setting to heat the heating media to a predetermined temperature (e.g., a desired temperature). The heating fluid enters the secondary inlet 222 via the first fluid line 512 and the inlet channel 354 distributes the heating fluid to the first heat tracing path 208 of the first face 204 and the second heat tracing path 210 on the second face 206 of the valve body 104. The heating media enters the first heat tracing path 208 from the inlet channel 354 and the heat media moves in a first direction 518 (e.g., counterclockwise direction in the orientation of FIG. 5A) around a first portion 520 of the first heat tracing path 208 and a second direction 522 (e.g., a clockwise direction in the orientation of FIG. 5A) around a second portion 524 of the first heat tracing path 208 when the heat media flows from the inlet channel 354 to the outlet channel 362. Likewise, the heating media enters the second heat tracing path 210 from the inlet channel 354 and the heat media moves in the first direction 518 (e.g., the counterclockwise direction in the orientation of FIG. 5B) around a first portion 526 of the second heat tracing path 210 and the second direction 522 (e.g., the clockwise direction in the orientation of FIG. 5B) around a second portion 528 of the second heat tracing path 210 when the heat media flows from the inlet channel 354 to the outlet channel 362.

In the illustrated example, the secondary inlet 222 is positioned closer to the bonnet 106 and the secondary outlet 230 is positioned further from the bonnet 106. For example, in the orientation of FIGS. 5A and 5B, the secondary inlet 222 is positioned above the secondary outlet 230. For example, the secondary outlet 230 is diametrically opposed to the secondary inlet 222 such that the first portion 520 and the second portion 524 of the first heat tracing path 208 are substantially equal in length (e.g., arcuate length) and the first portion 526 and the second portion 528 of the second heat tracing path 208 are substantially equal in length (e.g., arcuate length). This configuration provides a first heat distribution profile along the respective first heat tracing path 208 and the second heat tracing path 210. However, in some examples, the secondary outlet 230 can be positioned on the side wall 224 of the valve body 104 opposite the secondary inlet 222 relative to a longitudinal axis 530 (e.g., a vertical axis) such that the first portion 520 of the first heat tracing path 208 and the first portion 526 of the second heat tracing path 210 are substantially smaller in length relative to a length of the second portion 524 of the first heat tracing path 208 and the second portion 528 of the second heat tracing path 210. In this configuration, a first path can provide a first heat distribution profile and provide a second heat distribution profile that is different than the first heat distribution profile. For example, a first portion of the first heat tracing path 208 can provide greater heat distribution to the portion of the valve body 104 along a first heat tracing path compared to a heat distribution provided to a portion of the valve body 104 along a second heat tracing path.

As the heating fluid moves along the first heat tracing path 208 and the second heat tracing path 210, the heating fluid increases a temperature of the valve body 104. The heat tracing apparatus 102 utilizes the heating media at elevated temperatures (e.g. a high temperature steam) to transfer heat to the valve body 104. The heating media exits the first heat tracing path 208 and the second heat tracing path 210 via the outlet channel 362 and the secondary outlet 230 (e.g., as a low temperature steam, a condensate, etc.). At the secondary outlet 230, the heating media has a lower temperature than a temperature of the heating media at the secondary inlet 222. After exiting the secondary outlet 230, the heat media returns to the heater 510 via the second fluid line 514. The heat tracing apparatus 102 of the illustrated example allows heat transfer from the heat media to the valve body 106 as the heat media flows from the secondary inlet 222 to the secondary outlet 230 to restrict or prevent crystallization formation on the valve shaft 118, the flow control member 114, the valve body 104 and/or other components of the rotary valve 100. After exiting the secondary outlet 230, the heat media (e.g., low temperature steam) returns to the heater 510 via the second fluid line 514. The temperature of the heat media exiting the secondary outlet 230 is less than a temperature of the heat media entering the secondary inlet 222.

The heating system 500 of the illustrated example is a closed loop system. For example, the heating system 500 can include a pump to direct the flow of the heating media between the secondary inlet 222 and the secondary outlet 230. However, in some examples, the heating system 500 can be an open looped system and can be configured to receive a heating fluid from an upstream supply source. In some examples, the heating fluid can be released to the atmosphere via the secondary outlet 230. In some examples, the heating system 500 can include a controller that commands the heater 510 to control or vary (e.g., adjust) a temperature of the heating fluid at the secondary inlet 222. For example, the controller can receive temperature information from one or more sensors relating to the process fluid flowing through the fluid flow passageway 108 and can cause the heater 510 to control a temperature of the heating fluid based on measured temperatures of the process fluid and/or the valve body 104. In some examples, if a temperature of the process fluid and/or the valve body 104 is greater than a threshold, the controller can cause the heating system 500 to deactivate (e.g., turn off). Additionally, the heating media of the illustrated example is steam. However, in some examples, the heating media can be any other heating media or fluid.

In some examples, the heat tracing apparatus 102, the first heat tracing path 208, the second heat tracing path 210, the inlet channel 354, the outlet channel 362, the first groove 302 and/or the third groove 320 provides means for defining a heat flow path (e.g., the first heat tracing path 208 and/or the second heat tracing path 210) supported by a means for defining a fluid flow passageway (e.g., the valve body 104). In some examples, the first cover 216 and/or the second cover 220 provides means for covering the means for defining the heating flow path. In some examples, the first cover 216 and the first groove 302 provides means for defining a first heat flow path and/or the second cover 220 and the third groove 320 provides means for defining a second heat flow path. In some examples, the first cover 216 provides means for covering to fluidly isolates the first heat tracing path 208 from the fluid flow passageway 108. In some examples, the second cover 220 provides means for covering that fluidly isolates the second heat tracing path 210 from the fluid flow passageway 108. In some examples, the secondary inlet 222 and/or the inlet channel 354 provides means for defining a secondary inlet to fluidly couple a heating fluid and the first heat tracing path 208 and/or the second heat tracing path 210. In some examples, the secondary outlet 230 and/or the outlet channel 362 provides means for defining a secondary outlet to allow heating fluid to exit the first heat tracing path 208 and/or the second heat tracing path 210. In some examples, the fastener 340 and/or one or more of the welds 342a-d provides means for attaching the means for covering to the means for defining the fluid flow passageway.

Figure 6:
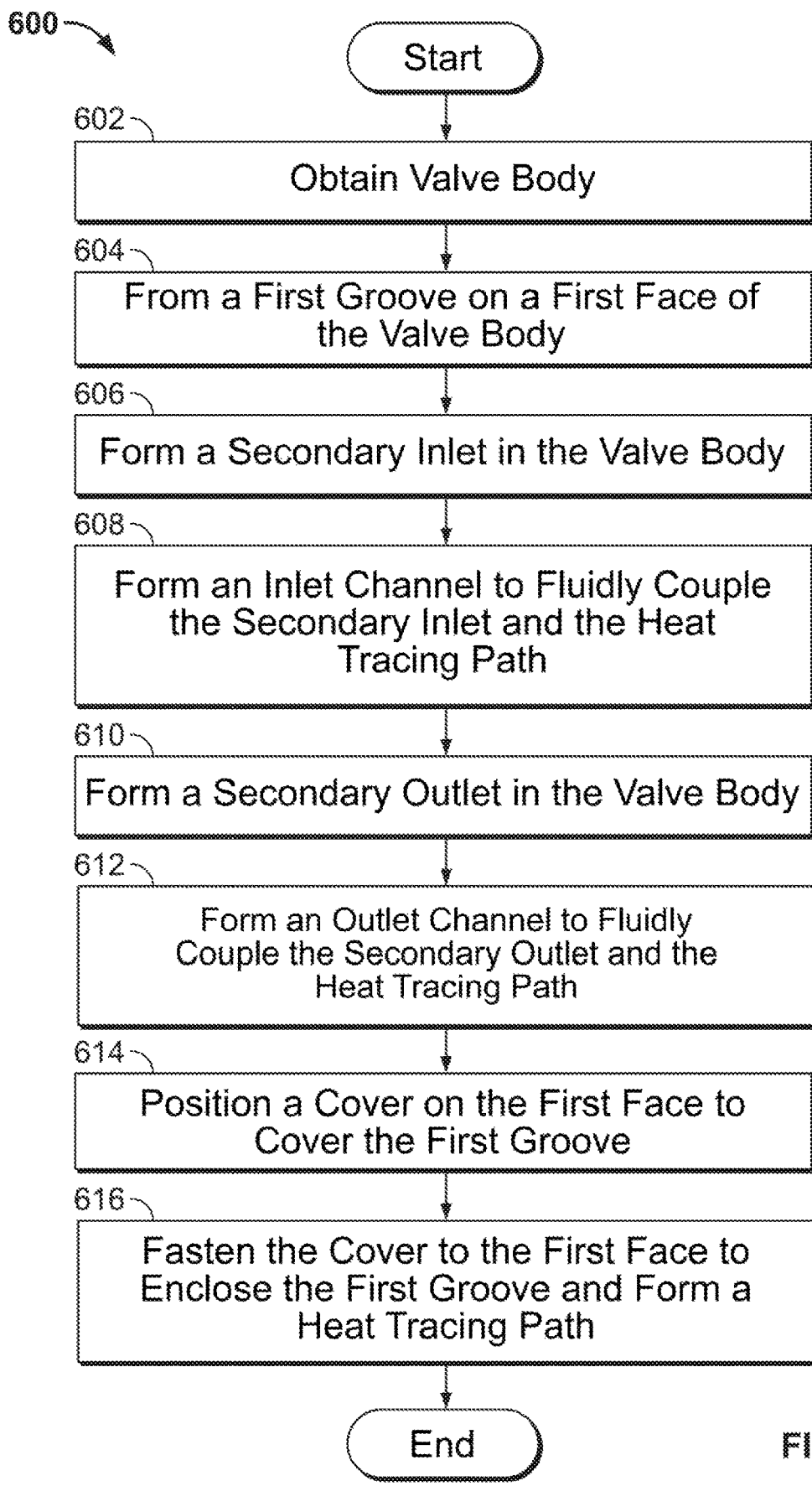
FIG. 6 is a flowchart of an example method of manufacturing an example valve body disclosed herein.

FIG. 6 is a flowchart of an example method 600 of fabricating an example fluid valve disclosed herein. For example, the method 600 of FIG. 6 may be used to fabricate or form the rotary valve 100 of FIGS. 1A and 1B. To facilitate discussion of the example method 600, the example method 600 will be described in connection with the rotary valve 100 of FIGS. 1A and 1B. FIGS. 7-12 are partial views of the rotary valve 100 of FIGS. 1A and 1B at various manufacturing stages corresponding to the example method 600 of FIG. 6.

Referring to the example method 600 of FIG. 6, the method 600 begins by obtaining a valve body 104 (block 602). For example, the valve body 104 can be formed via casting and/or any other manufacturing process.

Figure 7:
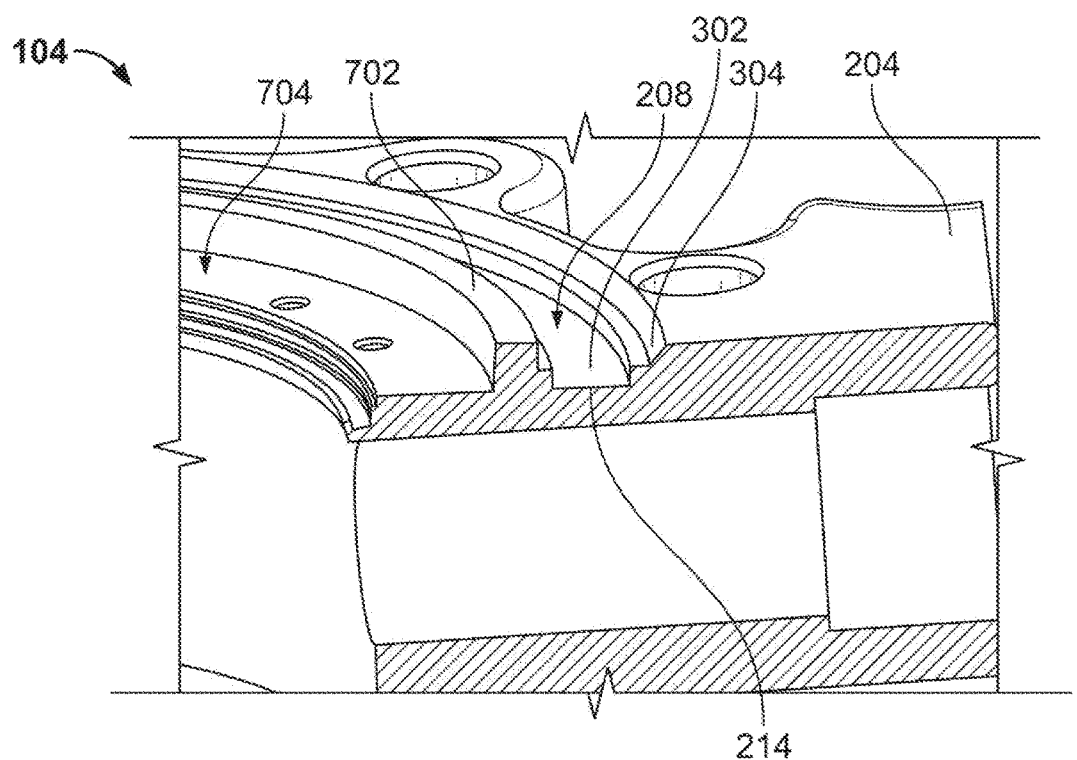
FIGS. 7-12 depict a series of figures showing the example valve body of FIGS. 1A, 1B, 2A, 2B, 3A-3C, 4, 5A and 5B at various manufacturing stages corresponding to the example method of FIG. 6.
Figure 8:
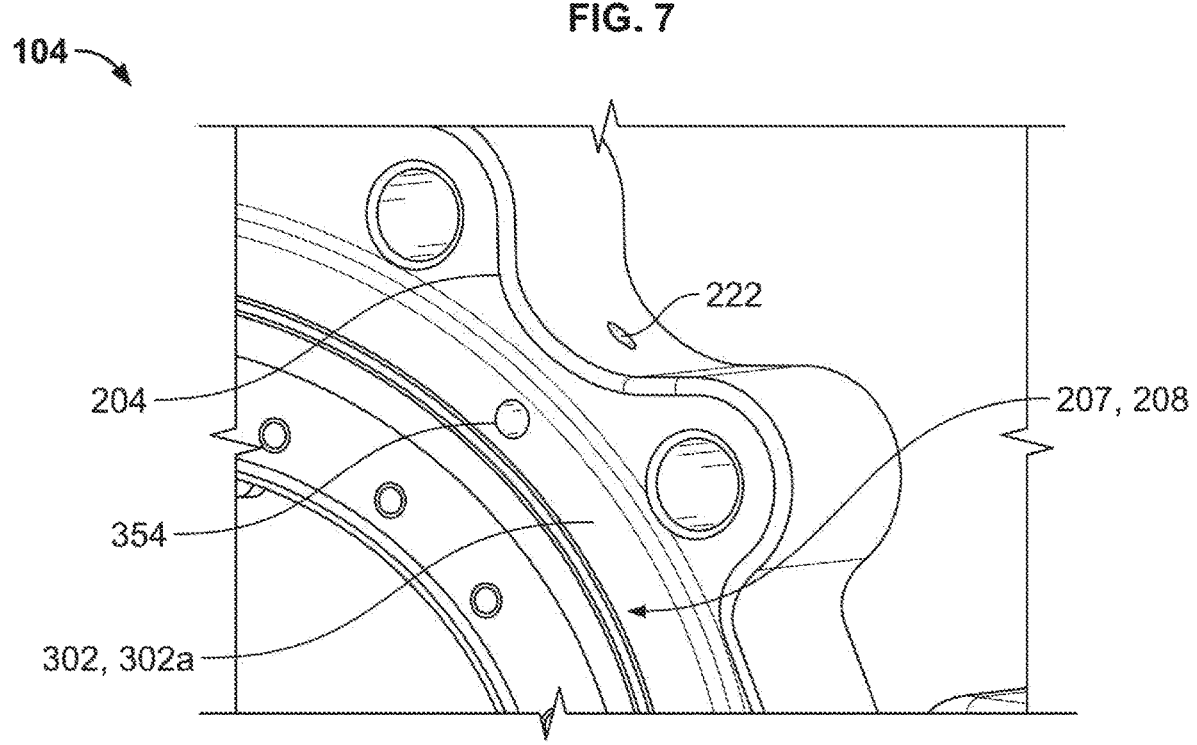
Figure 9:
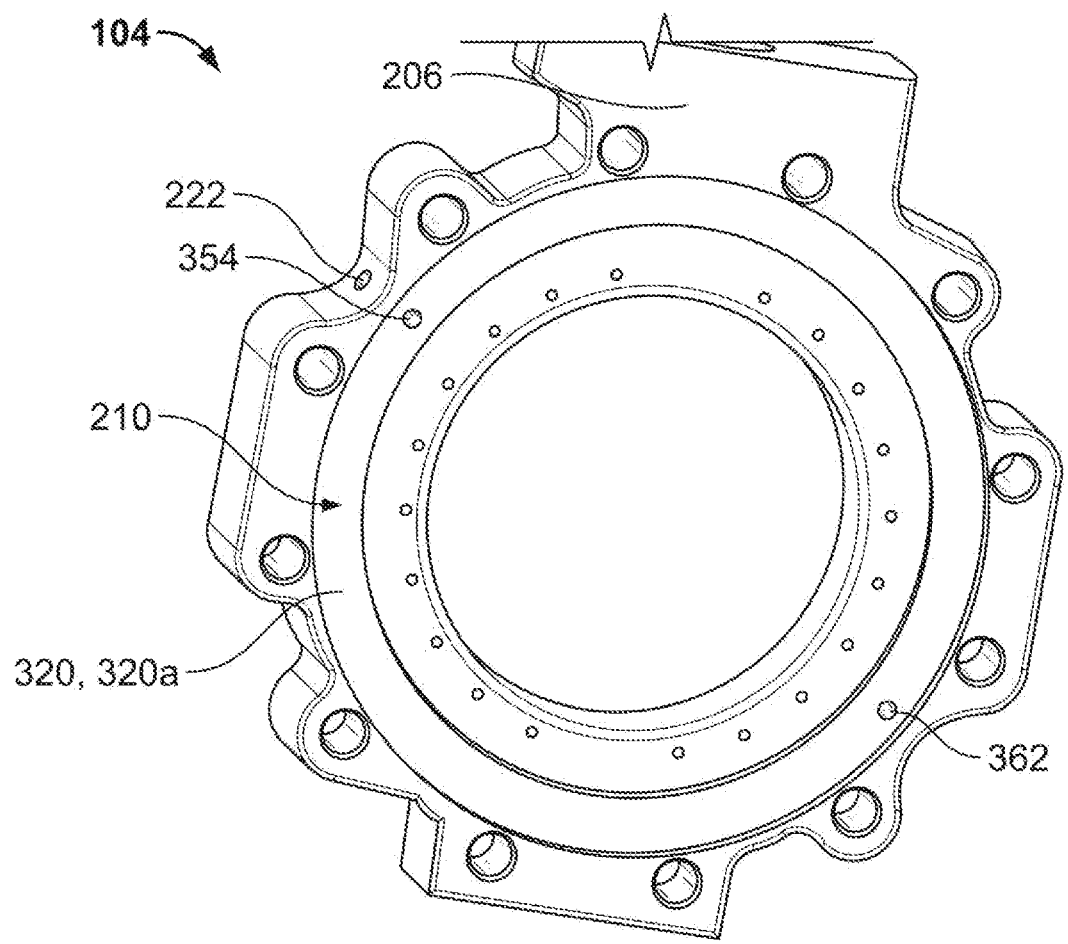

To form the heat tracing apparatus 102, the heat tracing path 207 is formed by forming the first groove 302 on the first face 204 of the valve body 104 (block 604). For example, referring to FIG. 7, the first groove 302 can be formed on the first face 204 of the valve body 104 (e.g., after formation of the valve body). In the illustrated example, the second groove 304 is formed adjacent the first groove 302 to define the first shoulder 304a and the second shoulder 304b between the first groove 302 and the second groove 304. In some examples, the first groove 302 and/or the second groove 304 can be formed via machining. In some examples, the first groove 302 and/or the second groove 304 can be formed during formation of the valve body 104 via, for example, casting. In some examples, the valve body 104, the first groove 302 and the second groove 304 can be manufactured using an additive manufacturing process (e.g., a direct metal laser sintering additive manufacturing process), injection molding, machining, and/or any other manufacturing process(es). As shown in FIG. 7, a separation wall 702 is formed between the first channel 214 and/or the first heat tracing path 208 and a cavity 704 to receive the seating surface 116 of the valve body 104. In the illustrated example, the second heat tracing path 210 is formed on the second face 206 of the valve body 104. For example, the third groove 320 and the fourth groove 322 are formed on the second face 206 opposite the first face 2304 and can be formed via the example manufacturing techniques used to form the first groove 302 and/or the second groove 304.

After formation of the first groove 302 on the first face 204, the secondary inlet 222 is formed on the valve body 104 (block 606). For example, referring to FIGS. 8 and 9, the secondary inlet 222 is formed on the side wall 224 of the valve body 104 between the first face 204 and the second face 206. An inlet channel 354 is formed to fluidly couple the secondary inlet 222 and the heat tracing path 207 (block 608). For example, the inlet channel 354 is formed in the valve body 104 and extends from the first wall 302a of the first heat tracing path 208 in communication with the secondary inlet 222. In the illustrated example, the inlet channel 354 extends through the valve body 104 between the first groove 302 formed on the first face 204 and the third groove 320 formed on the second face 206 and intersects the secondary inlet 222 so that the inlet channel 354 fluidly couples the secondary inlet 222 to the first heat tracing path 208 and the second heat tracing path 210. In some examples, the inlet channel 354 partially extends through the valve body 104 to the secondary inlet 222 when a single heat tracing path (e.g., the first heat tracing path 208) is formed with the valve body 104 (e.g., without the second heat tracing path 210).

Similarly, the secondary outlet 230 is formed on the valve body 104 (block 610). For example, the secondary outlet 230 is formed on the side wall 224 of the valve body 104 between the first face 204 and the second face 206. The outlet channel 362 is formed to fluidly couple the secondary outlet 230 and the heat tracing path 207 (block 612). For example, referring to FIG. 9, the outlet channel 362 is formed in the valve body 104 and extends from the first wall 302a of the first heat tracing path 208 to the secondary outlet 230. In the illustrated example, the outlet channel 362 extends through the valve body 104 between the first groove 302 formed on the first face 204 and the third groove 320 formed on the second face 206 and intersects the secondary outlet 230. In some examples, the outlet channel 362 can partially extend through the valve body 104 to the secondary outlet 230 when a single heat tracing path (e.g., the first heat tracing path 208) is formed with the valve body 104. (e.g., without the second heat tracing path 210).

Figure 10:
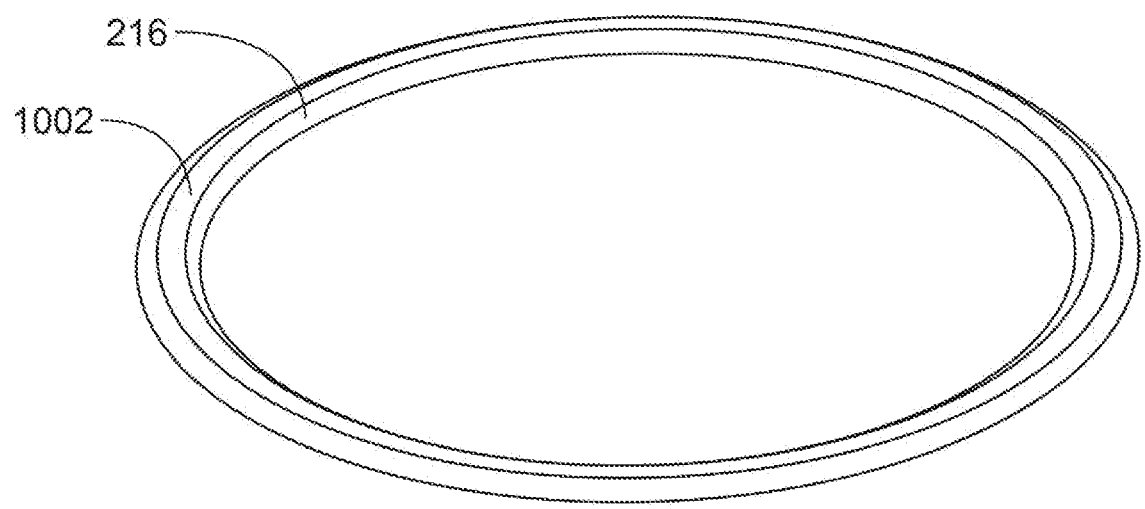
Figure 11:
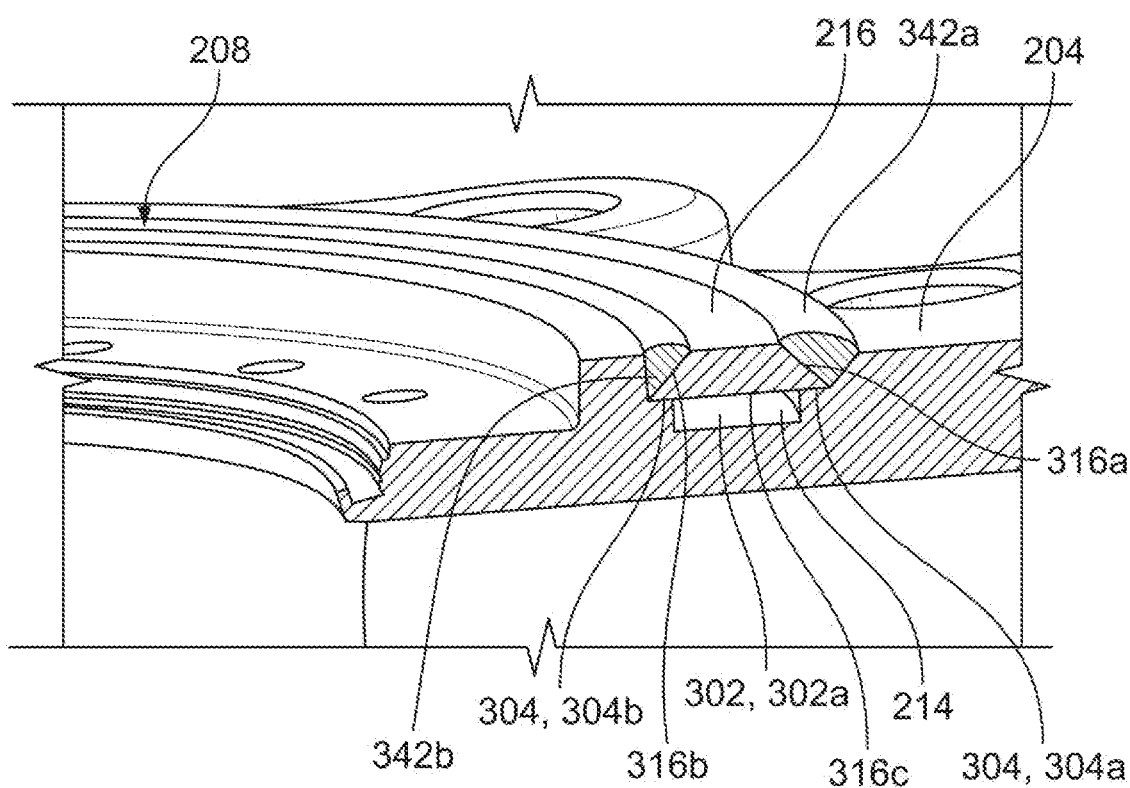

The first cover 216 is positioned on the first face 204 to cover the first groove 302 (block 614). FIG. 10 is a perspective view of the first cover 216. The first cover 216 is ring 1002. The ring 1002 can be composed of metal and/or any other suitable material(s) (e.g., thermoplastic material). The first cover 216 (e.g., and the second cover 220) can be formed via machining, casting, additive manufacturing, and/or any other suitable manufacturing processes. Referring to FIG. 11, the first cover 216 is positioned in the second groove 304 and the inner surface 316c of the first cover 216 is spaced from the first channel 214. For example, the first cover 216 is positioned on the first shoulder 304a and the second shoulder 304b formed by the second groove 304.

The first cover 216 is coupled to the first face 204 to enclose the first groove 302 and form the first heat tracing path 208 (block 616). For example, referring to FIG. 11, the first cover 216 is coupled to the first face 204 of the valve body 104 via the fastener 340. The fastener 340 of the illustrated example is first weld 342a between the first side wall 316a and the first face 204 and the second weld 342b between the second side wall 316b of the first cover 216 and the first face 204. The first cover 216 encloses the first groove 302 to define the first heat tracing path 208. In the illustrated example, the second cover 220, which is substantially similar to the first cover 216, is positioned and coupled to the second face 206 to define the second heat tracing path 210 via the third weld 342c and the fourth weld 342d.

Figure 12:
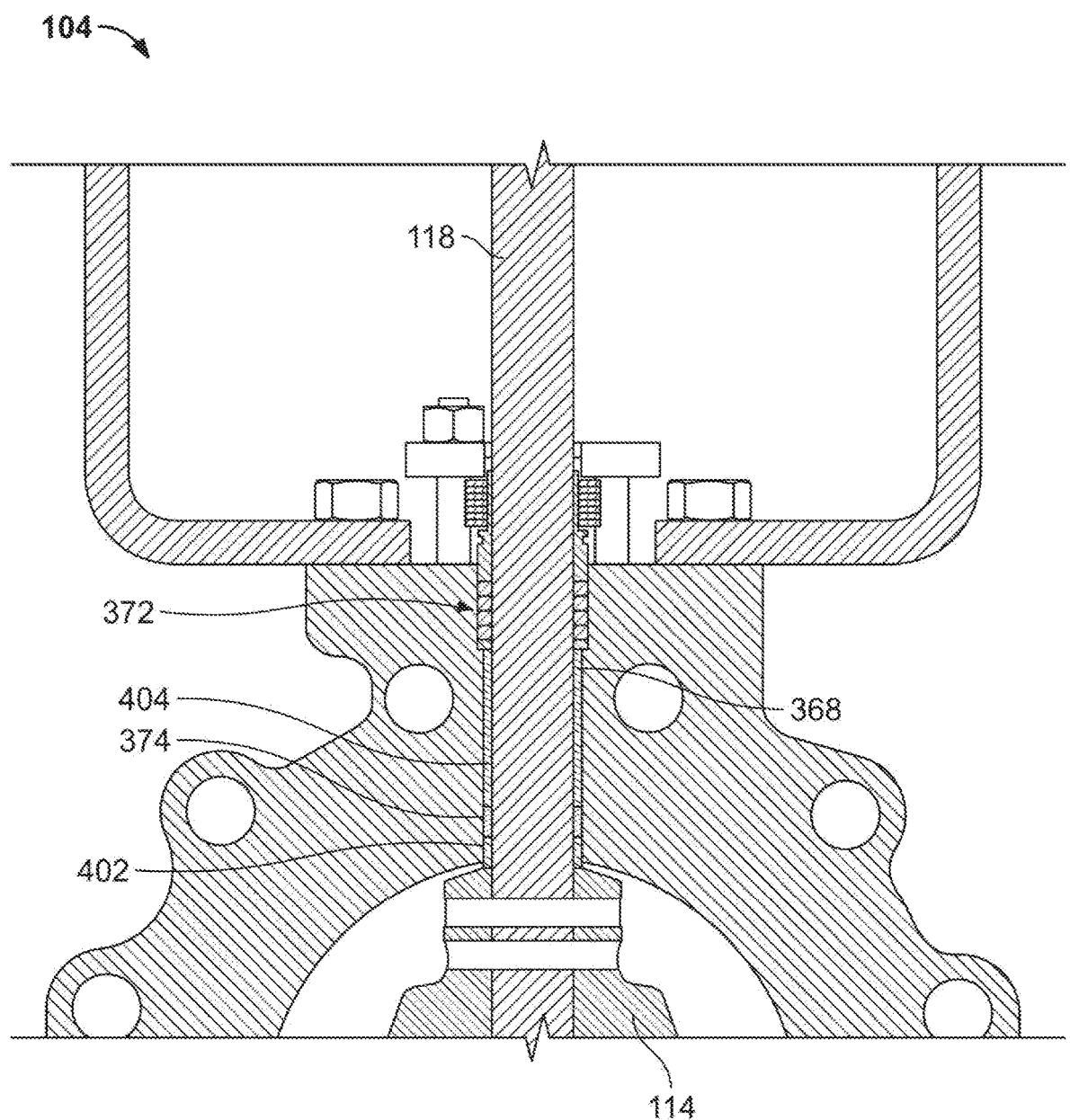

Referring to FIG. 12, the blocking ring 374 is coupled to the valve body 104 with (e.g., prior to and/or concurrently with) the installation of the first bearing 402 and the second bearing 404. The packing assembly 372 can be assembled prior to or after installation of the valve shaft 118 in the shaft bore 368. The heat tracing apparatus 102 disclosed herein does not require welding between the valve shaft 118 and the flow control member 114 to define the heat tracing path 207 as needed with known heat tracing systems.

In some examples, the rotary valve 100 disclosed herein can be manufactured using an additive manufacturing process (e.g., a direct metal laser sintering additive manufacturing process), injection molding, machining, and/or any other manufacturing process(es). For example, in some examples, valve body 104 and the heat tracing apparatus 102 can be formed via additive manufacturing. For example, the first heat tracing path 208, the second heat tracing path 210, the inlet channel 354, the secondary inlet 222, the outlet channel 362, the secondary outlet 230, the first cover 216, and/or the second cover 220 can be integrally formed as unitary piece or structure with the valve body 104 (e.g., via additive manufacturing). In some such examples, the first cover 216 and/or the second cover 220 can be flush mounted relative to the first face 204 and the second face 206, respectively. In other words, the first cover 216 and/or the second cover 220 can be formed as part of the first face 204 and the second face 206, respectively.

While an example manner of forming the example rotary valve 100 has been illustrated in FIGS. 6-12, one of the steps and/or processes illustrated in FIGS. 6-12 can be combined, divided, re-arranged, omitted, eliminated, and/or implemented in any other way. Further still, the example methods of FIGS. 6-12 can include processes and/or steps in addition to, or instead of, those illustrated in FIGS. 6-12 and/or may include more than one of any or all of the illustrated processes and/or steps. Further, although the example method 600 is described with reference to the flowchart illustrated in FIG. 6, many other methods, or processes of forming the rotary valve 100 can alternatively be used.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A valve comprising:
   a monolithic valve body defining a fluid flow passageway between a primary inlet and a primary outlet, the valve body having a first face adjacent the primary inlet and a second face adjacent the primary outlet, the first face including a first groove and the second face including a second groove;
   a first cover coupled to the first face and positioned over the first groove to define a first heat tracing path;
   a second cover coupled to the second face and positioned over the second groove to define a second heat tracing path;
   a secondary inlet formed in the valve body and fluidly coupled to the first heat tracing path;
   an inlet channel formed in the valve body between the first heat tracing path and the second heat tracing path to fluidly couple the secondary inlet to the first heat tracing path and the second heat tracing path;
   a secondary outlet formed in the valve body and fluidly coupled to the first heat tracing path; and
   an outlet channel formed in the valve body between the first heat tracing path and the second heat tracing path to fluidly couple the secondary outlet to the first heat tracing path and the second heat tracing path.

2. The valve of claim 1, wherein the fluid flow passageway provides a first flow path for a process fluid between the primary inlet and the primary outlet, and wherein the first heat tracing path provides a second flow path for a heating media.

3. The valve of claim 1, wherein the fluid flow passageway is fluidly isolated from the first heat tracing path.

4. The valve of claim 1, wherein the first cover is coupled to the first face via a fastener.

5. The valve of claim 1, wherein the first heat tracing path is to receive steam.

6. The valve of claim 1, wherein the first groove is an annular groove formed on the first face of the valve body.

7. The valve of claim 1, wherein the first heat tracing path includes a first seating surface provided by a first shoulder and a second shoulder formed by the first groove and a third groove, the first cover to engage at least a portion of the first shoulder and at least a portion of the second shoulder when the first cover is coupled to the valve body.

8. The valve of claim 7, wherein the first groove has a diameter that is less than a diameter of the third groove.

9. The valve of claim 1, wherein a first wall, a second wall and a third wall of the first groove and an inner surface of the first cover define the first heat tracing path.

10. The valve of claim 1, wherein the valve is a rotary valve.

11. A valve comprising:
a monolithic valve body defining a fluid flow passageway to receive a process fluid, the fluid flow passageway defining a primary inlet and a primary outlet, the valve body defining a first face and a second face opposite the first face, the first face oriented toward the primary inlet and the second face oriented toward the primary outlet, the first face configured to receive a first conduit to carry the process fluid to the primary inlet and the second face configured to receive a second conduit to carry the process fluid from the primary outlet, the valve body including a first annular flow path formed within a surface of the first face of the valve body, a secondary inlet formed in the valve body to allow a heating media to enter the first annular flow path, and a secondary outlet formed in the valve body to allow the heating media to exit the first annular flow path;
a seat ring coupled to the valve body to define a seal;
a flow control member positioned in the fluid flow passageway and movable relative to the seat ring between an open position and a closed position to control the process fluid through the fluid flow passageway; and
a first cover coupled to the first face of the valve body to enclose the first annular flow path, the first cover having an inner diameter that is greater than a first outer diameter of the seat ring.

12. The valve of claim 11, wherein the inner diameter of the first cover is greater than a second outer diameter of the fluid flow passageway.

13. The valve of claim 11, wherein the first annular flow path includes a first recessed groove and a second recessed groove to form a seating surface.

14. The valve of claim 13, wherein the first cover is to couple to the second recessed groove, the first cover and the first recessed groove defining the first annular flow path.

15. The valve of claim 11, wherein the valve body further includes a second annular flow path formed in the second face of the valve body, the second annular flow path being in fluid communication with the secondary inlet and the secondary outlet, and further including a second cover coupled to the second face of the valve body to enclose the second annular flow path.

16. The valve of claim 15, wherein the valve body further includes an inlet channel formed in the valve body between the first face of the valve body and the second face of the valve body and in fluid communication with the secondary inlet, the inlet channel to fluidly couple the secondary inlet to the first annular flow path and the second annular flow path.

17. The valve of claim 16, wherein the valve body further includes an outlet channel formed in the valve body between the first face of the valve body and the second face of the valve body and in fluid communication with the secondary outlet, the outlet channel to fluidly couple the secondary outlet to the first annular flow path and the second annular flow path.

18. The valve of claim 16, wherein the inlet channel has a longitudinal axis that is parallel to a longitudinal axis of the fluid flow passageway.

19. The valve of claim 11, wherein a longitudinal axis of the seat ring is coaxially aligned with a longitudinal axis of the first cover.

20. The valve of claim 11, wherein a longitudinal axis of the seat ring is coaxially aligned with a longitudinal axis of the fluid flow passageway.

21. A valve comprising:
means for defining a fluid flow passageway to receive a process fluid between a primary inlet and a primary outlet, the means for defining a fluid flow passageway having a monolithic body further including:
means for defining a first heating flow path formed within a surface defining the means for defining the fluid flow passageway adjacent the primary inlet, the heating flow path being fluidly isolated from the fluid flow passageway;
means for defining a second heating flow path formed within a surface defining the means for defining the fluid flow passageway adjacent the primary outlet, the second heating flow path being fluidly isolated from the fluid flow passageway;
means for providing a secondary inlet to fluidly couple a heating fluid to the first heating flow path and the second heating flow path;
first means for fluidly coupling formed in the means for defining the fluid flow passageway between the means for defining the first heating flow path and the means for defining the second heating flow path, the first means for fluidly coupling to fluidly couple the means for defining the first heating flow path, the means for defining the second heating flow path and the means for providing the secondary inlet;
means for providing a secondary outlet to allow the heating fluid to exit the means for defining the first heating flow path and the means for defining the second heating flow path; and
second means for fluidly coupling formed in the means for defining the fluid flow passageway between the means for defining the first heating flow path and the means for defining the second heat tracing path, the second means for fluidly coupling to fluidly couple the means for defining the first heating flow path, the means for defining the second heating flow path and the means for providing the secondary outlet;
first means for covering the means for defining the first heating flow path; and
second means for covering the means for defining the second heating flow path.

22. The valve of claim 21, further including means for attaching the first means for covering to the means for defining the fluid flow passageway.

23. The valve of claim 21, further including means for sealing coupled to the means for defining the fluid flow passageway.

24. The valve of claim 23, further including means for controlling fluid flow positioned in the fluid flow passageway and movable relative to the means for sealing between an open position and a closed position to control the process fluid through the fluid flow passageway.

* * * * *